US011638204B2

(12) United States Patent
Mildh et al.

(10) Patent No.: US 11,638,204 B2
(45) Date of Patent: Apr. 25, 2023

(54) HANDLING LIMITED NETWORK SLICE AVAILABILITY

(71) Applicant: TELEFONAKTIEBOLAGET LM ERICSSON (PUBL), Stockholm (SE)

(72) Inventors: Gunnar Mildh, Sollentuna (SE); Angelo Centonza, Stockholm (SE); Paul Schliwa-Bertling, Ljungsbro (SE); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 495 days.

(21) Appl. No.: 16/347,456

(22) PCT Filed: Nov. 3, 2017

(86) PCT No.: PCT/IB2017/056895
§ 371 (c)(1),
(2) Date: May 3, 2019

(87) PCT Pub. No.: WO2018/083664
PCT Pub. Date: May 11, 2018

(65) Prior Publication Data
US 2021/0282082 A1     Sep. 9, 2021

Related U.S. Application Data

(60) Provisional application No. 62/417,677, filed on Nov. 4, 2016.

(51) Int. Cl.
*H04W 48/18* (2009.01)
*H04W 76/11* (2018.01)
(Continued)

(52) U.S. Cl.
CPC .......... *H04W 48/18* (2013.01); *H04W 36/14* (2013.01); *H04W 68/005* (2013.01); *H04W 76/11* (2018.02)

(58) Field of Classification Search
CPC ....... H04L 12/28; H04W 48/18; H04W 76/11; H04W 68/005; H04W 36/14
(Continued)

(56) References Cited

U.S. PATENT DOCUMENTS

| 11,153,813 | B2* | 10/2021 | Qiao ............... H04M 15/66 |
| 2009/0047963 | A1 | 2/2009 | Kim |
| 2014/0068045 | A1 | 3/2014 | Tarui |

FOREIGN PATENT DOCUMENTS

| CN | 105813195 B | 5/2019 |
| CN | 106060900 B | 12/2019 |
| JP | 2016184853 A | 10/2016 |

OTHER PUBLICATIONS

NTT DOCOMO: "Solution to support a UE with simultaneous connections to multiple Network Slices",3GPP Draft; S2-161043 Solution MultipleNetworkSliceConnection, 3rd Generation Partnership Project (3GPP), Mobile Competence Centre ; 650, Route Des Lucioles ; F-06921 Sophia-Antipolis Cedex ; France,vol. SA WG2,Feb. 2016.*
(Continued)

*Primary Examiner* — Dang T Ton

(57) ABSTRACT

According to certain embodiments, a method is disclosed for use in a network node. The method comprises obtaining network slice availability associated with one or more neighboring network nodes. The network slice availability indicates which of a plurality of network slices is supported by each of the one or more neighboring network nodes. The method further comprises managing slice connectivity of a wireless device based on the network slice availability of the one or more neighboring network nodes.

44 Claims, 14 Drawing Sheets

(51) Int. Cl.
*H04W 36/14* (2009.01)
*H04W 68/00* (2009.01)
(58) Field of Classification Search
USPC ................................................. 370/329
See application file for complete search history.

(56) References Cited

OTHER PUBLICATIONS

Turk Telekom, Network Slicing Solution with RAN Slicing, SA WG2 Temporary Document, SP-160534, TSG SA Meeting #SP-73, New Orleans, USA, Sep. 21-23, 2016.
Huawei, Key principles for Support of Network Slicing in RAN, R2-165019, RAN WG2 Meeting #95, Gothenburg, Sweden, Aug. 22-26, 2016.
Nokia, et al., Key principles for Slice Selection Support in RAN, R3-160735, 3GPP TSG-RAN WG3 Meeting #91 bis, Bangalore, India, Apr. 11-15, 2016.
3GPP TR 23.799 V0.3.0, 3rd Generation Partnership Project; Technical Specification Group Services and System Aspects; Study on Architecture for Next Generation System, (Release 14), 3GPP TR 23.799 V0.3.0 (Mar. 2016).
Ericsson, Radio interface implications of network slicing, Tdoc R2-166931, 3GPP TSG-RAN WG2 #95bis, Kaohsiung, Taiwan, Oct. 10-14, 2016.
Huawei, Procedure of initial access, 3GPP TSG-RAN WG3 Meeting #94, R3-162951, Reno, Nevada, USA Nov. 14-18, 2016.
Huawei, Support of network slice discovery, 3GPP TSG-RAN WG3 Meeting #93 bis, R3-162462, Sophia Antipolis, France, Oct. 10-14, 2016.
ITRI, RAN Slicing in NR, 3GPP TSG-RAN WG2 Meeting #96 bis, R2-168065, Reno, USA Nov. 14-18, 2016.
LG Electronics, Evaluation on solution 1.11, SA WG2 Meeting #117, S2-165619, Kaohsiung City, Taiwan, Oct. 17-21, 2016.
LG Electronics, Evaluation on solution 1.9, SA WG2 Meeting #117, S2-165618, Kaohsiung City, Taiwan, Oct. 17-21, 2016.
X. Zhou et al., Network Slicing as a Service: Enabling Enterprises' Own Software-Defined Cellular Networks, IEEE Communications Magazine • Jul. 2016.
ZTE et al., Consideration on the impact of NW slicing on RAN, 3GPP TSG-RAN WG2 Meeting #95 bis, R2-166344, Kaohsiung Oct. 10-14, 2016.
ZTE, Consideration on RAN architecture impacts of network slicing, 3GPP TSG-RAN WG2 Meeting #93 bis, R2-162627, Dubrovnik, Croatia Apr. 11-15, 2016.
Ericsson: "Solution for selection of a network slice instance". S2-163338. SA Wg2 Meeting #116. Jul. 11-15, 2016. Vienna, AT.
Nokia, et al.: "Radio resource Isolation requirements". R2-166171. 3GPP TSG-RAN WG2 Meeting #95bis. Kaohsiung, Taiwan, Oct. 10-14, 2016.

* cited by examiner

HANDLING LIMITED NETWORK SLICE AVAILABILITY

This application is a 371 of International Application No. PCT/IB2017/056895, filed Nov. 3, 2017, which claims the benefit of U.S. Application No. 62/417,677, filed Nov. 4, 2016, the disclosures of which are fully incorporated herein by reference.

TECHNICAL FIELD

The present disclosure relates, in general, to wireless communications and, more particularly, to handling limited network slice availability in a wireless network.

BACKGROUND

Network slicing is a new concept that applies to both LTE Evolution and new 5G RAT (in this document called NR). The key driver for introducing network slicing is application expansion, i.e. improving the cellular operator's ability to serve other industries, e.g., by offering connectivity services with different network characteristics (performance, security, robustness, and complexity).

Network slicing in a network creates logically separated partitions of the network, addressing different applications. These "network slices" are logically separated to a degree that they can be regarded and managed as networks of their own. Network slices can be associated to different slice tenants, namely entities that provide services to the end used via the network slice. Example of slice tenants could be the armed forces, e.g. providing Voice services via a dedicated network slice; vehicles manufacturers, e.g. providing vehicle diagnostic services via a dedicated network slice; and more. It is also common to associate a Service Level Agreement (SLA) to each network slice. Such SLA indicates the treatment services provided within the network slice should be subject to.

A problem that has not been addressed is related to limited slice availability in the network. Limited slice availability may occur where a given network slice is not supported in all cells of the cellular network or not for all wireless devices/subscribers in all cells. In these cases problems will occur when the wireless is moving in or out of areas with different slice support. Problems will also occur when the wireless device is connecting to the network for the first time (or re-connecting) in case the slice the wireless device wants to connect to or is already registered in is not available in that area. Accordingly there is proposed herein several embodiments for handling limited slice availability in the network.

SUMMARY

According to certain embodiments, a method is disclosed for use in a network node. The method comprises obtaining network slice availability associated with one or more neighboring network nodes. The network slice availability indicates which of a plurality of network slices is supported by each of the one or more neighboring network nodes. The method further comprises managing slice connectivity of a wireless device based on the network slice availability of the one or more neighboring network nodes.

According to certain embodiments, a network node comprises storage operable to store instructions and processing circuitry operable to execute the instructions. The network node is operable to obtain network slice availability associated with one or more neighboring network nodes. The network slice availability indicates which of a plurality of network slices is supported by each of the one or more neighboring network nodes. The network node is further operable to manage slice connectivity of a wireless device based on the network slice availability of the one or more neighboring network nodes According to certain embodiments, a computer program product comprises a non-transitory computer readable medium storing computer readable program code. The computer readable program code comprises program code for obtaining network slice availability associated with one or more neighboring network nodes. The network slice availability indicates which of a plurality of network slices is supported by each of the one or more neighboring network nodes. The computer readable program code further comprises program code for managing slice connectivity of a wireless device based on the network slice availability of the one or more neighboring network nodes.

The above-described method, network node, and/or computer program code may include various other features, including any one or more of the following:

In certain embodiments, each of the network slices comprises a respective logical network that supports a respective network function having different characteristics than the network functions of the other network slices.

In certain embodiments, each of the network slices supports a respective business operation that is independent of the business operations supported by the other network slices.

In certain embodiments, the one or more neighboring nodes comprise a plurality of core network nodes, and the method/wireless device/computer program product receives a slice identifier indicating which of the network slices the wireless device requests to use. The method/wireless device/computer program product further selects one of the core network nodes based on the network slice availability, wherein the selected core network node supports the network slice indicated by the slice identifier. The method/wireless device/computer program product further provides the wireless device with access to the selected core network node.

In certain embodiments, the one or more neighboring nodes comprise a plurality of radio network nodes, and the method/wireless device/computer program product manages the slice connectivity of the wireless device by determining which of the network slices the wireless device is connected to. The method/wireless device/computer program product further manages the slice connectivity of the wireless device by selecting one of the radio network nodes for handover based on the network slice availability. The selected radio network node supports the network slice(s) that the wireless device is connected to. The method/wireless device/computer program product further manages the slice connectivity of the wireless device by initiating handover of the wireless device to the selected radio network node.

In certain embodiments, the plurality of network slices comprises a first network slice and the method/wireless device/computer program product manages the slice connectivity of the wireless device by removing a connection between the wireless device and the first network slice in response to determining, based on the network slice availability, that the wireless device is connected to a radio access node that does not support the first network slice.

In certain embodiments, the plurality of network slices comprises a first network slice and the method/wireless device/computer program product manages the slice connectivity of the wireless device by adding a connection between the wireless device and the first network slice in response to determining, based on the network slice availability, that the wireless device is connected to a radio access node that supports the first network slice.

In certain embodiments, the plurality of network slices comprises a first network slice and the method/wireless device/computer program product manages the slice connectivity of the wireless device by rejecting a request to connect the wireless device to the first network slice in response to determining that the wireless device is connected to a radio access node that does not support the first network slice.

In certain embodiments, at least a portion of the network slice availability is obtained during an initial connection set up between the first network node and at least one of the neighboring network nodes.

In certain embodiments, at least a portion of the network slice availability is obtained from handover signaling between the first network node and one of the neighboring network nodes.

In certain embodiments, at least a portion of the network slice availability is obtained in response to the wireless device performing a state transition from an idle state to an active state.

In certain embodiments, the method/wireless device/computer program product maintains slice connection information at the first network node. The slice connection information indicating which of the network slices the wireless device is connected to. The method/wireless device/computer program also receives an indication that the wireless device has added or removed a connection to one of the network slices. The method/wireless device/computer program also updates the slice connection information maintained by the first network node based on the received indication.

In certain embodiments, the plurality of network slices comprises a first network slice and the method/wireless device/computer program creates a paging area with consistent network slice availability for the wireless device. The paging area comprises one or more of the neighboring network nodes that, based on the network slice availability, support the first network slice. The method/wireless device/computer program also communicates an indication of the paging area that supports the first network slice to the wireless device.

In certain embodiments, method/wireless device/computer program, in response to determining that the wireless device has added or removed a connection to one of the network slices, creates a new paging area with consistent network slice availability for the wireless device. The method/wireless device/computer program also communicates the new paging area to the wireless device.

In certain embodiments, method/wireless device/computer program manages slice connectivity by initiating removal of a connection between the wireless device and a network slice that is unsupported by a neighboring network node selected for a handover procedure involving the wireless device.

In certain embodiments, the method/wireless device/computer program manages slice connectivity by receiving, from the wireless device, a request to connect to a first network slice. The method/wireless device/computer program further manages slice connectivity by rejecting the request and redirecting the wireless device to another network slice in response to determining that the first network node does not support the first network slice.

In certain embodiments, the method/wireless device/computer program manages the slice connectivity by receiving, from the wireless device, a request to connect to a first network slice. The method/wireless device/computer program further manages the slice connectivity by rejecting the request and redirecting the wireless device to another network slice based on a likelihood of the wireless device moving to a neighboring network node that does not support the first network slice.

In certain embodiments, the method/wireless device/computer program broadcasts a parameter associated with the network slice availability of the first network node and/or one or more of the neighboring network nodes.

In certain embodiments, method/wireless device/computer program communicates the first network node's network slice availability to one or more of the neighboring network nodes.

In certain embodiments, the network node is a core network node.

In certain embodiments, the network node is a radio network node.

According to certain embodiments, a method is disclosed for use in a wireless device. The method comprises receiving, from a network node, information associated with network slice availability in a network comprising the network node. The method further comprises communicating a connectivity request to the network node for access to a first network slice. The first network slice is selected by the wireless device based at least in part on the information associated with network slice availability received from the network node.

According to certain embodiments, a wireless device comprising storage operable to store instructions and a processor operable to execute the instructions. The wireless device is operable to receive, from a network node, information associated with network slice availability in a network comprising the network node. The wireless device is further operable to communicate a connectivity request to the network node for access to a first network slice. The first network slice is selected by the wireless device based at least in part on the information associated with network slice availability received from the network node.

According to certain embodiments, a computer program product comprises a non-transitory computer readable medium storing computer readable program code. The computer readable program code comprises program code for receiving, from a network node, information associated with network slice availability in a network comprising the network node. The computer readable program code further comprises program code for communicating a connectivity request to the network node for access to a first network slice. The first network slice is selected by the wireless device based at least in part on the information associated with network slice availability received from the network node.

The above-described method, wireless device, and/or computer program code may include various other features, including any one or more of the following:

In certain embodiments, at least a portion of the information associated with network slice availability is received in a broadcast from the network node.

In certain embodiments, at least a portion of the information associated with network slice availability is based on network configuration information received from the network prior to receiving the broadcast from the network node.

In certain embodiments, the method/wireless device/computer program initiates the setup of a network slice connection based on the information associated with network slice availability.

In certain embodiments, the method/wireless device/computer program initiates a removal of a network slice connection based on the information associated with network slice availability.

In certain embodiments, the method/wireless device/computer program performs reselection of one or more of a cell, a frequency, or a radio access technology based on the information associated with network slice availability.

In certain embodiments, the method/wireless device/computer program performs reselection by determining that a current cell, frequency, or radio access technology (RAT) on which the wireless device is operating does not support the first network slice. The method/wireless device/computer program performs reselection by further selecting a new cell, frequency, or RAT that supports the first network slice. The method/wireless device/computer program performs reselection by further accessing the first network slice through the new cell, frequency, or RAT.

In certain embodiments, the method/wireless device/computer program communicates a slice identifier indicating the first network slice. The method/wireless device/computer program further accesses a core network node that supports the first network slice indicated by the slice identifier.

In certain embodiments, the method/wireless device/computer program receives an initiation of a handover procedure to a second network node. The second network node supports the first network slice. The method/wireless device/computer program further completes handover to a second network node. The method/wireless device/computer program further accesses the first network slice through the second network node.

In certain embodiments, the method/wireless device/computer program communicates the information associated with network slice availability to another network node when performing a state transition from an idle state to an active state.

In certain embodiments, the method/wireless device/computer program receives a paging area with consistent network slice availability for the wireless device. The paging area comprises one or more neighboring network nodes to the network node that, based on network slice availability of the neighboring network node, support the first network slice. The method/wireless device/computer program further prevents the generation of mobility signaling when the wireless device is within the paging area.

In certain embodiments, the method/wireless device/computer program communicates area update signaling from the wireless device when the wireless device moves outside the received paging area. The method/wireless device/computer program further receives a new paging area with consistent network slice availability for the wireless device.

In certain embodiments, the method/wireless device/computer program communicates the wireless device's network slice connection information to the network node. The method/wireless device/computer program further receives handover signaling from the network node. The handover signaling comprises a handover candidate based on the network slice availability of neighboring network nodes and the network slice connection information of the wireless device. The method/wireless device/computer program further connects to the handover candidate.

In certain embodiments, the handover candidate does not support the first network slice, the method further comprising connecting to a second network slice.

Certain embodiments of the present disclosure may provide one or more technical advantages. For example, enhance connectivity of wireless devices to network slices in a network with limited network slice availability by managing the connectivity of the wireless device based on the network slice availability. As another example, certain embodiments may advantageously manage connectivity using a slice identifier indicating the network slices the wireless device requests to use. As yet another example, certain embodiments may advantageously create a paging area with consistent network slice availability for the wireless device. In this manner, when the wireless device moves within the paging area, the wireless device does not unnecessarily generate mobility signaling. As another example, certain embodiments may advantageously inform the wireless device when it is connected to a network slice. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
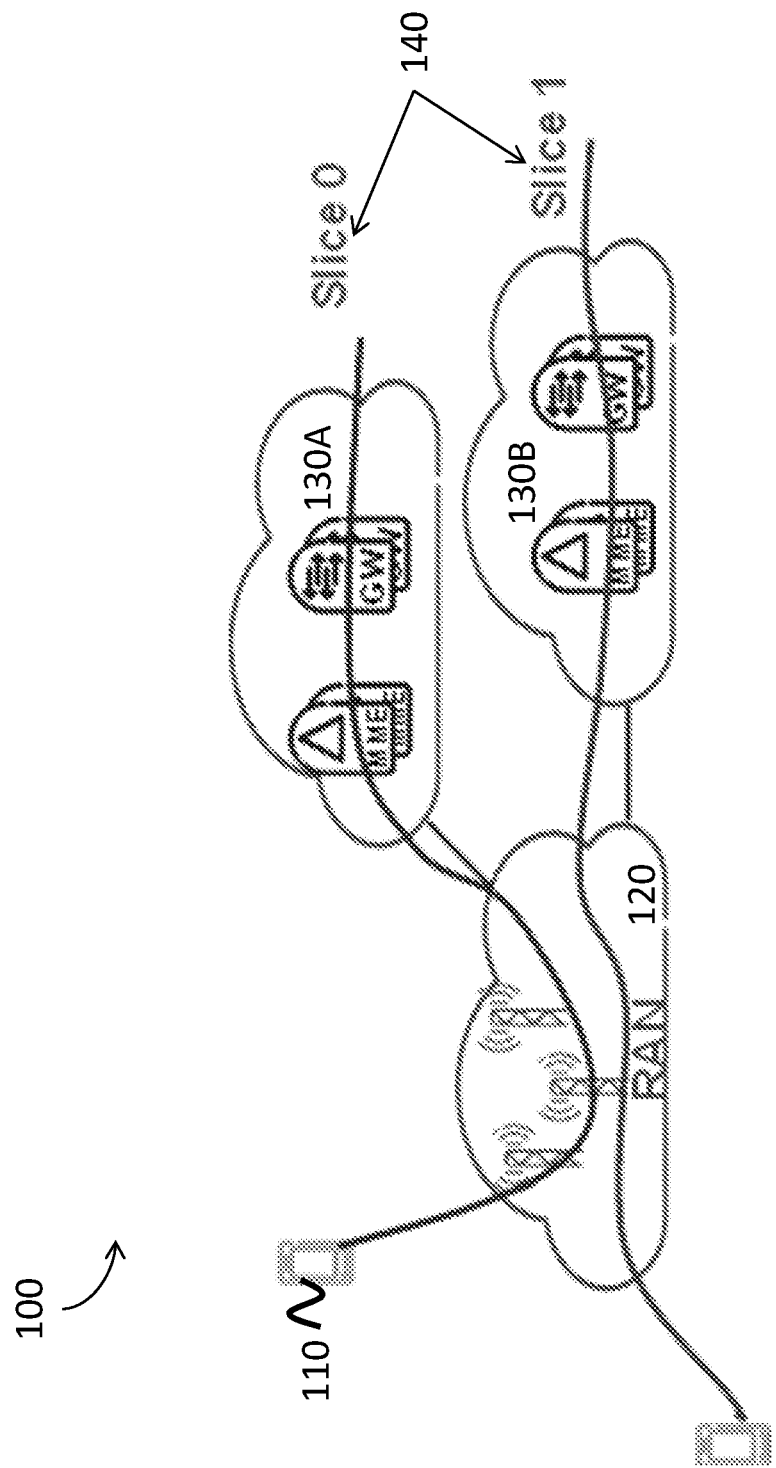
FIG. 1 is a block diagram illustrating an embodiment of a network with slices, in accordance with certain embodiments.

The support for network slicing is an important part of the vision for the Next Generation architecture. As stated by different fora, such as Next Generation Mobile Networks, network slicing consists of deploying multiple end-to-end logical networks in support of independent business operations. In contrast to deploying an independent network infrastructure, each instance of a slice (blueprint) should be possible to realize as a logical network corresponding to a shared infrastructure (including shared processing, storage, transport, radio spectrum, and hardware platforms), where it co-exists with other slices having potentially different characteristics.

In this way, the infrastructure and assets utilization will be much more cost- and energy-efficient while the logical separation allows for a flexible and independent configuration and management of the slices without compromising stability and security. Enabling slice realization over a common physical infrastructure would of course not prevent the realization of a slice instance by means of dedicated resources and assets.

In 3GPP, the notion of network slicing has also been introduced as a way to address the needs for the different vertical industries, translated into a wide range of use cases for the Next Generation architecture. To give a few examples, 3GPP TR 22.891 V14.0.0 (2016-03) explicitly states that a network slice should support the communication service requirements of particular use case(s). A set of service and operations requirements associated to network slicing has been provided. In 3GPP SA2, network slicing is presented as one of the high level architectural requirements and is listed as one of the key issues in order to enable the operator to create networks customised to provide optimized solutions for different market scenarios, which present diverse requirements. Example use cases for such customized logical networks could include public safety, V2X, Internet-of-Things (IoT), highlighting the importance of network slicing as a common platform to address multiple industries.

The support for network slicing is also listed as a requirement for the new RAT, as discussed in 3GPP TR 38.913 V0.3.0 (2016-03). In order to fulfill that, one of the objectives listed in 3GPP SID Proposal RP-160671 is to study and identify specification impacts when enabling the realization of network slicing. Some initial studies have also been done within the research community. In RAN3 the following aspects have been captured for network slicing in TR 38.801 (the editor's notes have been removed):

RAN Awareness of Slices
  RAN shall support a differentiated handling of traffic for different network slices which have been pre-configured. How RAN supports the slice enabling in terms of RAN functions (i.e. the set of network functions that comprise each slice) is implementation dependent.
Selection of RAN Part of the Network Slice
  RAN shall support the selection of the RAN part of the network slice, by a slice ID provided by the UE which unambiguously identifies one of the pre-configured network slices in the PLMN.
Resource Management Between Slices
  RAN shall support policy enforcement between slices as per service level agreements. It should be possible for a single RAN node to support multiple slices. The RAN should be free to apply the best RRM policy for the SLA in place to each supported slice.
Support of QoS
  RAN shall support QoS differentiation within a slice.
RAN Selection of CN Entity
  RAN shall support initial selection of the CN entity for initial routing of uplink messages based on received slice ID and a mapping in the RAN node (CN entity, slices supported). If no slice ID is received, the RAN selects the CN entity based on NNSF like function, e.g. UE temporary ID.
Resource Isolation Between Slices
  RAN shall support resource isolation between slices. RAN resource isolation may be achieved by means of RRM policies and protection mechanisms that should avoid that shortage of shared resources in one slice breaks the service level agreement for another slice. It should be possible to fully dedicate RAN resources to a certain slice According to certain embodiments, it is proposed herein to enhance the operation of network nodes and wireless devices within networks with limited network slice availability. Network slicing is about creating logically separated partitions of the network, addressing different application purposes. These "network slices" are logically separated to a degree that they can be regarded and managed as networks of their own. Network slices can be associated to different slice tenants, namely entities that provide services to the end used via the network slice. Example of slice tenants could be the armed forces, e.g. providing Voice services via a dedicated network slice; vehicles manufacturers, e.g. providing vehicle diagnostic services via a dedicated network slice; and more. It is also common to associate a Service Level Agreement (SLA) to each network slice. Such SLA indicates the treatment services provided within the network slice should be subject to.

Network slicing is a new concept that applies to both LTE Evolution and new 5G RAT (in this document called NR). The key driver for introducing network slicing is business expansion, i.e. improving the cellular operator's ability to serve other industries, e.g., by offering connectivity services with different network characteristics (performance, security, robustness, and complexity).

The current working assumption is that there will be one shared Radio Access Network (RAN) infrastructure that will connect to several Core Network instances, such as Evolved Packet Core (EPC) instances (one EPC instance per network slice) or a further EPC evolution. As the CN functions (e.g. EPC functions) are being virtualized, it is assumed that the operator may instantiate a new Core Network (CN) when a new slice should be supported. In another case the network slices could be implemented based on existing monolithic EPC architecture based on special purpose hardware.

FIG. 1 illustrates an embodiment of a network 100 with network slices 140, according to certain embodiments. Network 110 may comprise wireless devices 110, radio access network (RAN) 120, core network functions 130A and 130B, and network slices 140 (i.e. Slice 0 and Slice 1).

Wireless devices 110 may connect to one of network slices 140 through RAN 120 and one of core network functions 130A or 130B.

In certain embodiments, each of core network functions 130A or 130B may support a specific one of network slices 140. For example, core network function 130A may support Slice 0 and core network function 130B may support Slice 1, as illustrated in FIG. 1. Wireless device 110 may connect to a particular one of network slices 140 by connecting through RAN 120 to a particular one or one of a group of core network functions 130 that support that particular one of network slices 140.

Each of network slices 140 may represent a different function or application. For example, Slice 0 of network slices 140 may be a Mobile Broadband slice and Slice 1 of network slices 140 may be a Machine Type Communication network slice. Although illustrated as wireless devices 110 connected to only one of network slices 140, respectively, in certain embodiments, one or more of wireless devices 110 may connect to more than one of network slices 140 concurrently.

Figure 2:
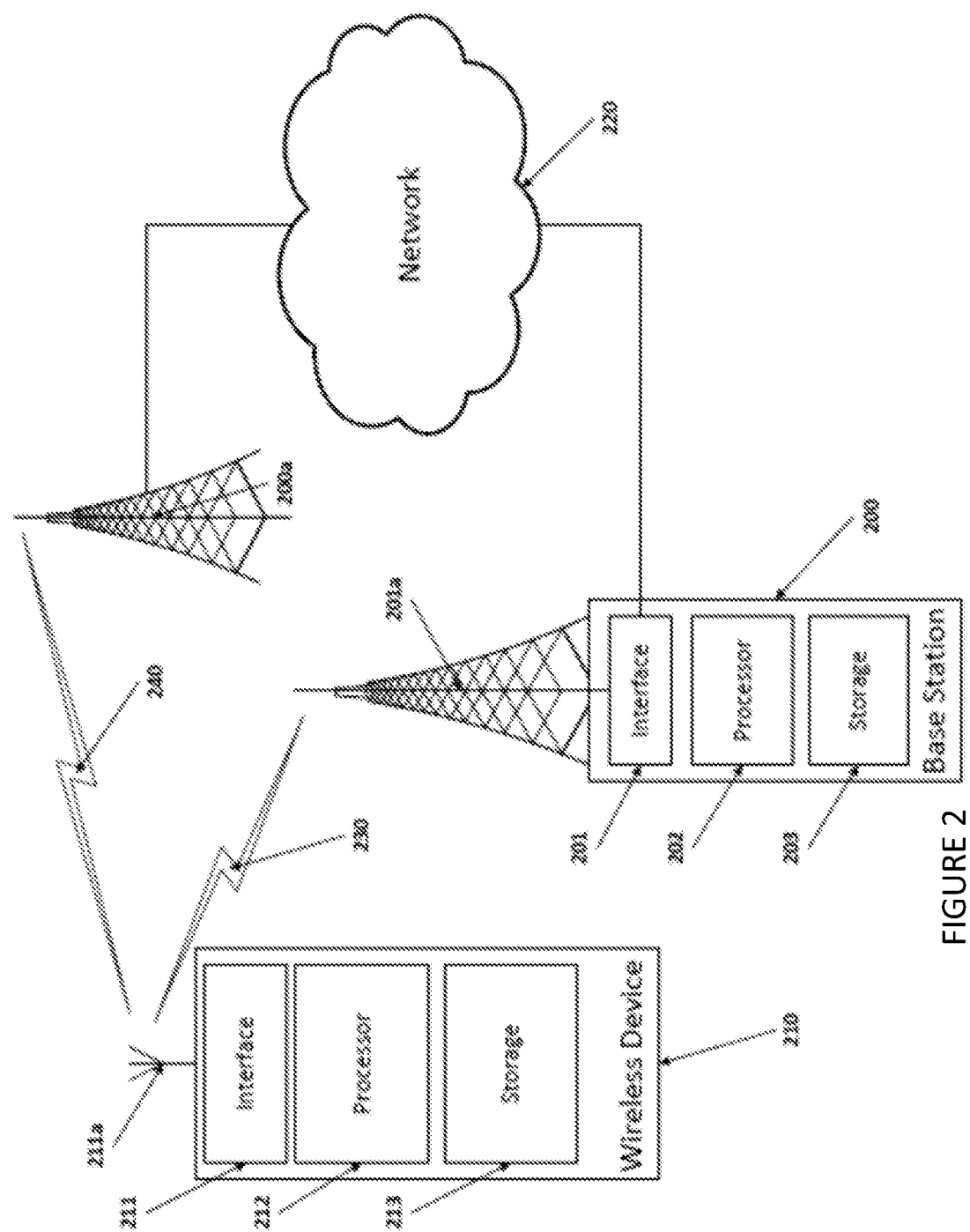
FIG. 2 is a block diagram illustrating an embodiment of a network comprises a wireless device and a base station, in accordance with certain embodiments.

Although the solutions described herein may be implemented in any appropriate type of system using any suitable components, particular embodiments of the described solutions may be implemented in a wireless network such as the example wireless communication network illustrated in FIG. 2. In the example embodiment of FIG. 2, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 2 illustrates a wireless network comprising a more detailed view of network node 200 and wireless device (WD) 210, in accordance with a particular embodiment. For simplicity, FIG. 2 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 2, Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein. For example, in certain embodiments processor 202 may execute instructions to perform the method discussed with respect to FIG. 13.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signaling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 2, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein. For example, in certain embodiments, processor 212 may execute instructions to perform the method discussed with respect to FIG. 14.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signaling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 3:
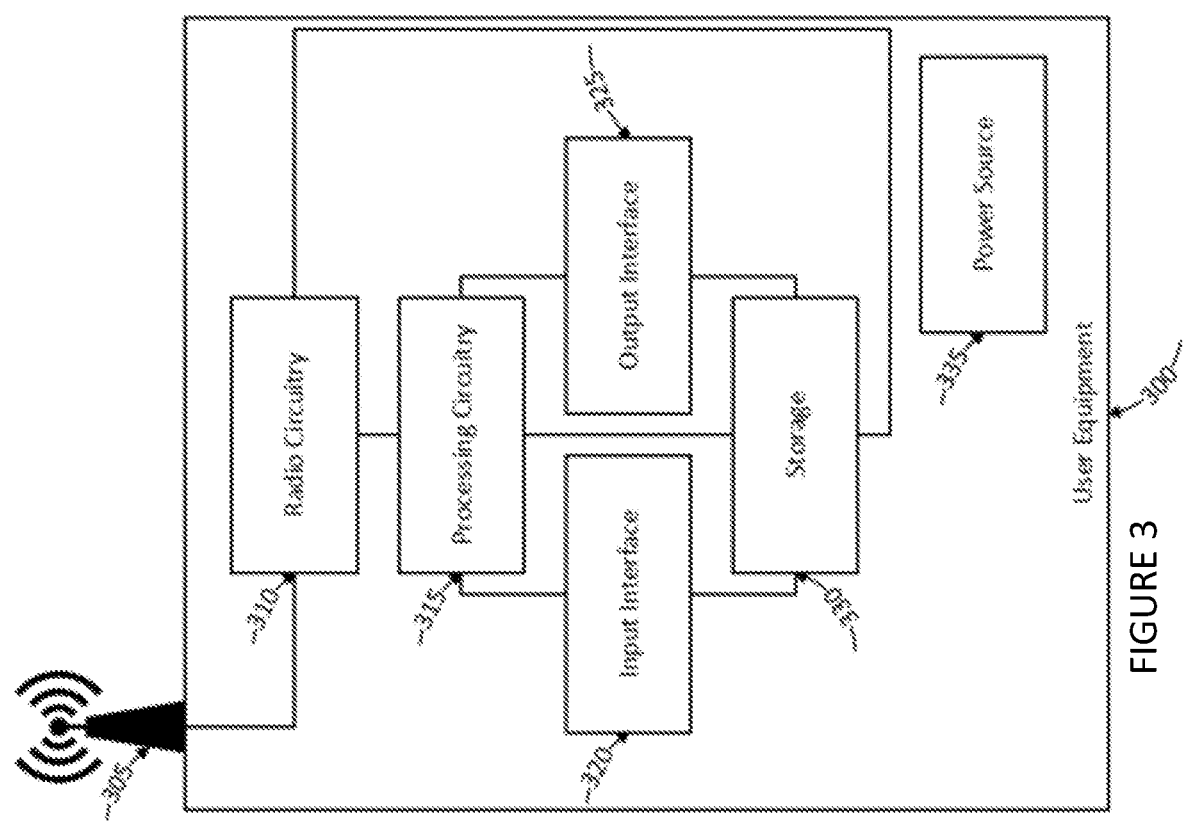
FIG. 3 is a block schematic of an exemplary wireless device, in accordance with certain embodiments.

FIG. 3 illustrates an example wireless device, user equipment (UE) 300. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination. In certain embodiments, processing circuitry may execute instructions to perform the method discussed with respect to FIG. 13.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 3 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chipsets and other components within wireless device 300.

LTE Architecture

Figure 4:
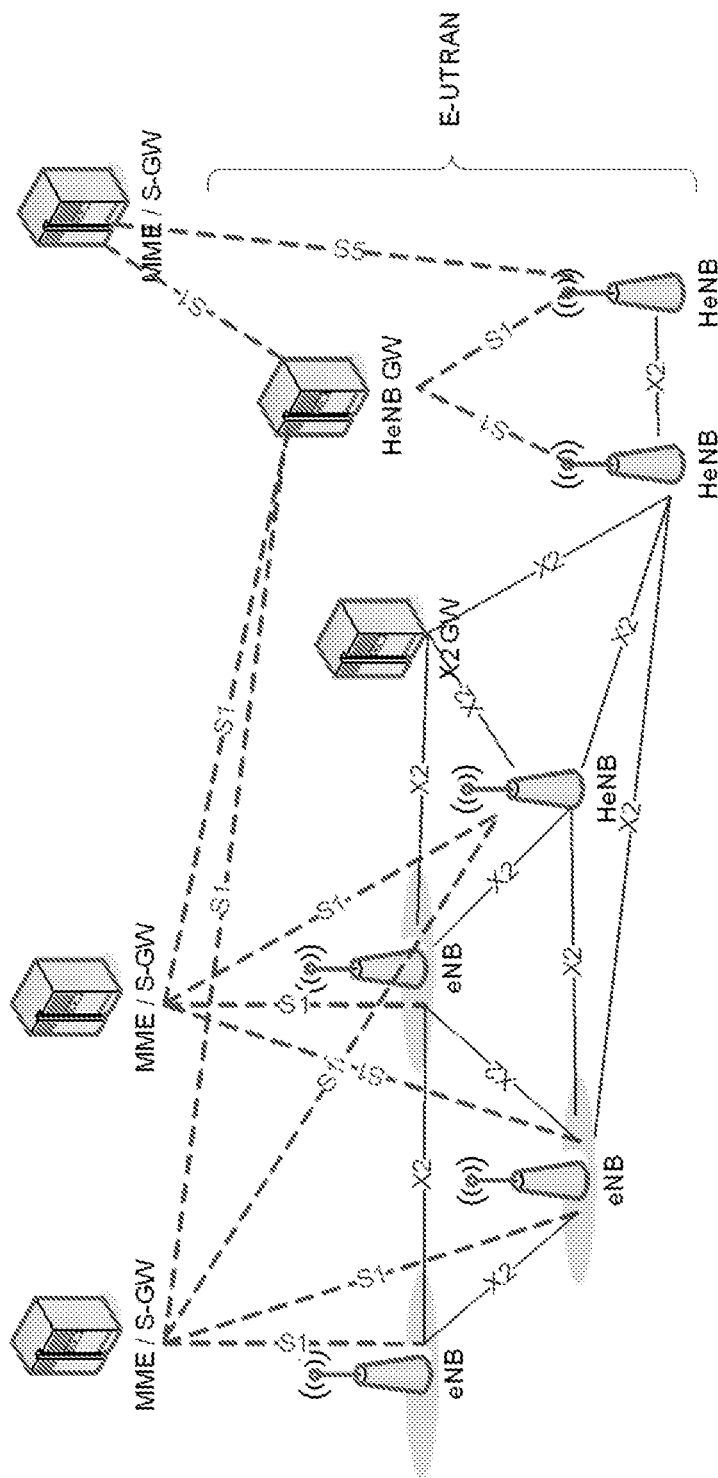
FIG. 4 is a block diagram illustrating an embodiment of a network architecture, in accordance with certain embodiments.

The third generation partnership project (3GPP) is currently working on standardization of Release 13 of the Long Term Evolution (LTE) concept. The architecture of the LTE system is shown in FIG. 4, including radio access nodes (eNBs, Home eNBs—HeNBs, HeNB GW) and evolved packet core nodes (MME/S-GW). As it can be seen an S1 interface connects HeNBs/eNBs to the MME/S-GW and HeNBs to the HeNB GW, while an X2 interface connects peer eNBs/HeNBs, optionally via an X2 GW.

Figure 5:
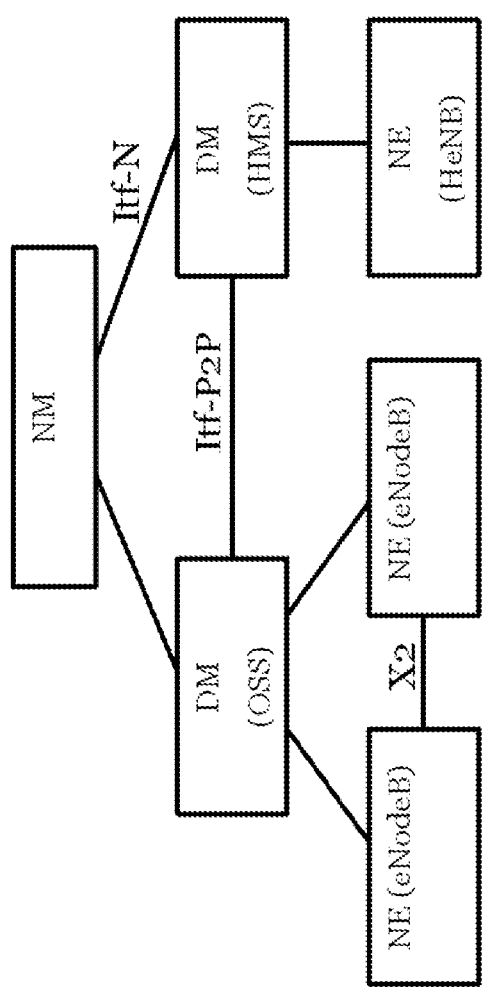
FIG. 5 is a block diagram illustrating an embodiment of a network architecture, in accordance with certain embodiments.

The management system assumed in this disclosure is shown in FIG. 5. The node elements (NE), also referred to as eNodeB, are managed by a domain manager (DM), also referred to as the operation and support system (OSS). A DM may further be managed by a network manager (NM). Two NEs are interfaced by X2, whereas the interface between two DMs is referred to as Itf-P2P. The management system may configure the network elements, as well as receive observations associated to features in the network elements. For example, DM observes and configures NEs, while NM observes and configures DM, as well as NE via DM. By means of configuration via the DM, NM and related interfaces, functions over the X2 and S1 interfaces can be carried out in a coordinated way throughout the RAN, eventually involving the Core Network, i.e. MME and S-GWs.

LTE Architecture Evolution and 5G RAN Architecture

It is not yet specified by 3GPP if and how the LTE architecture should evolve to meet the challenges of the 5G time frame. We can however assume that there will be evolved counterparts of the S1, X2 and Uu interfaces and that any new RAT would be integrated with the LTE radio interface at RAN level in a similar fashion as the way LTE Dual Connectivity is defined. The overall principles disclosed herein would work for both an LTE-like architecture and a new architecture based on an evolution of the S1 interface.

When it comes to the 5G RAN architecture, there could be novel interfaces e.g. between some synchronous and asynchronous functionalities. Different discussions are ongoing in the industry about a possible future evolution of the current RAN architecture. From a starting point in a macro site based topology the introduction of low power cells, the evolution of the transport network between the different radio base station sites, the radio base station hardware evolution, the increased need for processing power and so on, have given rise to new challenges and opportunities. Several strong forces are at work on the RAN architecture, pulling in sometimes different directions. Some, like the gains of coordination, hardware pooling gains, energy saving gains and the evolution of the backhaul/fronthaul network are working in favor of a more centralized deployment while others are working towards de-centralization, such as very low latency requirements for some 5G use cases e.g. mission critical MTC applications. The terms fronthaul and backhaul are used in relation to the base station. The traditional definition for fronthaul is the CPRI based fiber link between the baseband (Main Unit) and the Radio Unit. The backhaul refers to the transport network used for S1/X2-interfaces.

The recent evolution in backhaul/fronthaul has indeed opened up the possibility to centralize the baseband, often referred to as C-RAN. C-RAN is a term that can be interpreted in different ways. For some it means a "baseband hotel" like solutions in which the basebands from many sites are collocated to a central site but there is no tight connection and fast exchange of data between the sites. The most common interpretation is maybe "Centralized RAN" where there is at least some kind of coordination between the basebands. A potentially attractive solution is the smaller centralized RAN that is based on a macro base station and the lower power nodes covered by it. In this configuration a tight coordination between the macro and the low power nodes can often give considerable gains. The term "Coordinated RAN" is an often used interpretation that focuses on the coordination gains of the centralization. Other more futuristic interpretations of C-RAN include "cloud" based and "virtualized" RAN solutions where the radio Network functionality is supported on generic hardware (general purpose processors) and possibly as virtual machines.

A centralized deployment can be driven by one or several forces like e.g. a possible ease of maintenance, upgrade and less need for sites as well as harvesting of coordination gains. A common misconception is that there is a large pooling gain and a corresponding HW saving to be done by the centralization. The pooling gain is large over the first number of pooled cells but then diminishes quickly. One key advantage of having the basebands from a larger number of sites co-located and interconnected is the tight coordination that it allows. Examples of these are UL CoMP and combining several sector/carriers into one cell. The gains of these features can sometimes be significant in relation to the gains of looser coordination schemes such as e.g. eICIC that can be done over standard interfaces (X2) without co-location of the baseband.

An attractive C-RAN deployment from a coordination gain perspective is the C-RAN built around a larger macro site, normally with several frequency bands, and a number of lower power radios, covered by the macro site, that are tightly integrated into the macro over high-speed interconnect. The largest gains are expected to be seen in deployment scenarios such as stadiums and malls. An important consideration for any C-RAN deployment is the transport over the fronthaul, i.e. the connection between the centralized baseband part and the radios, "the first mile". The cost of the fronthaul, which vary rather greatly between markets, needs to be weighed against the benefits.

Figure 6:
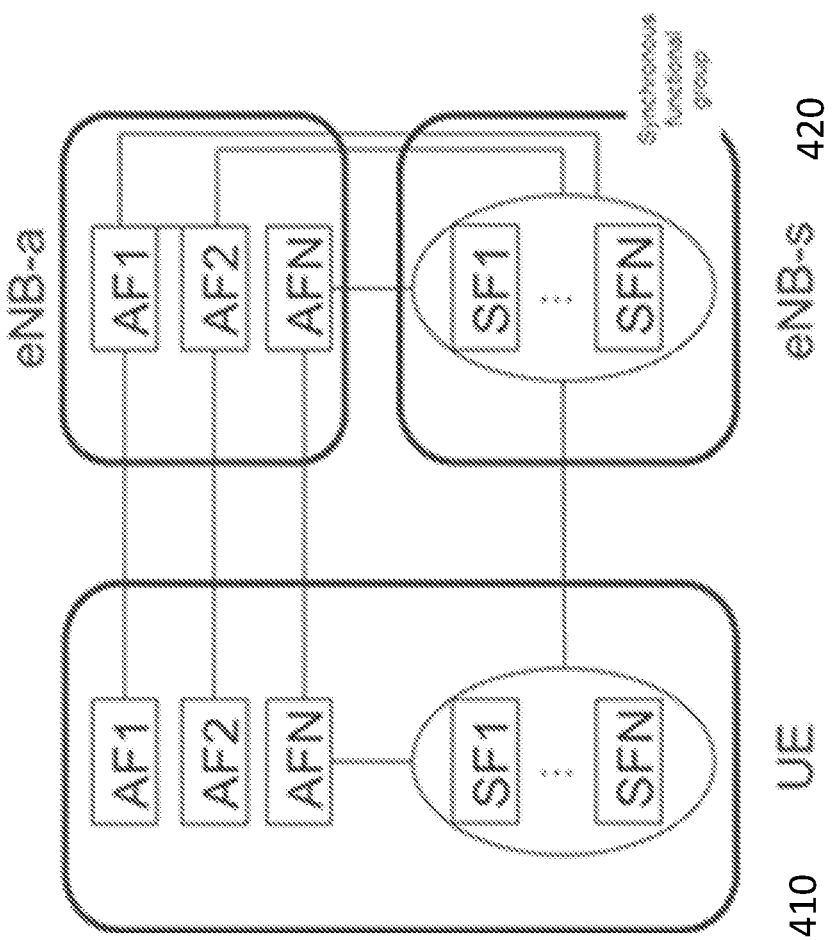
FIG. 6 is a block diagram illustrating an embodiment of a radio area network functional split at a network node, in accordance with certain embodiments.

Future discussions in 3GPP may lead to a RAN functional split shown in FIG. 6. Therein, the RAN functions are classified in synchronous (placed in a logical node called s-eNB) and asynchronous (placed in a logical node called a-eNB) functions. The instances of functions associated to the s-eNB i.e. the synchronous functions (SFs) are placed at the closest node to the air interfaces. These will form what is called a synchronous functional group (SFG). Meanwhile, the instances of the asynchronous functions (AFs) associated to the eNB-a (also called a-eNB in the current document) can be flexibly instantiated either at closest node to the air interface (i.e. the same node where the s-eNB (also called eNB-s in the current document) functions are instantiated) or in fixed network nodes (FNNs).

5G Core Network Architecture

There are several architecture options discussed and documented in the 3GPP TR 23.799v1.0.2. The below is the Option 6 which reflects an option that will certainly be modified in the course of the ongoing study and thus modifications can be expected. The below is section 7.6 from 3GPP TR 23.799v1.0.2:

7.6.1 General

The NextGen network reference architecture should consider the following aspects:
 1) Support 5G use cases and service requirements
 2) Enable Operational agility (enable extreme automation (faster deployments, upgrades, reduce TCO)
 3) Allow independent evolution of different parts of the network (e.g. access and core).

Key Architecture Principles:
 Abstract the transport domain from 3GPP network functions to allow for independent evolution and to enable operators to use different transport technologies (e.g. Ethernet, MPLS, SDN-based transport, etc.). 3GPP network functions should neither mandate nor rule out support for any of these technologies in the transport domain.

Allow Scalability of UP and CP Functions Independently
 Allow for a flexible deployment of UP separate from the CP, i.e. central location or distributed (remote) location (i.e. with no restriction in the location).
 Support transmission of different PDU types, e.g. IP, Ethernet
 Separation of functions including subscription database from functions providing the end user service
 Separation of Policy function to govern the network behaviour and end user experience
 Allows for different network configurations in different network slices.

Control Plane:
 It is important for the UE to trust that certain functionalities are supported in the network thus important to enable multi-vendor interworking between UE and network functions. However, from the UE perspective, it is irrelevant how and where it exists within the network (e.g. which function module or software supports a certain function).
 It is important to enable multi-vendor interworking between radio and network functions within the core network and between the network functions within the core network. At the same time, it is sufficient if a single interface is exposed towards the radio while abstracting the modular (elementary) functions supported in the core network.

User Plane:
 A generic user-plane function (UP function) is defined, which supports various user-plane operations (incl. forwarding operations to other UP functions/data networks/the control-plane, bitrate enforcement operations, service detection operations, etc.)
 NOTE 1: The detailed list of user-plane operations will be based upon the conclusion of key issue 4.
 The control plane configures the UP functions to provide the traffic handling functionality needed for a session. One or multiple UP functions per session can be activated and configured by the control-plane as needed for a given user-plane scenario.
 To support low latency services and access to local data networks, user plane functions can be deployed close to the radio. For central data networks, UPFs can be deployed centrally.

Figure 7:
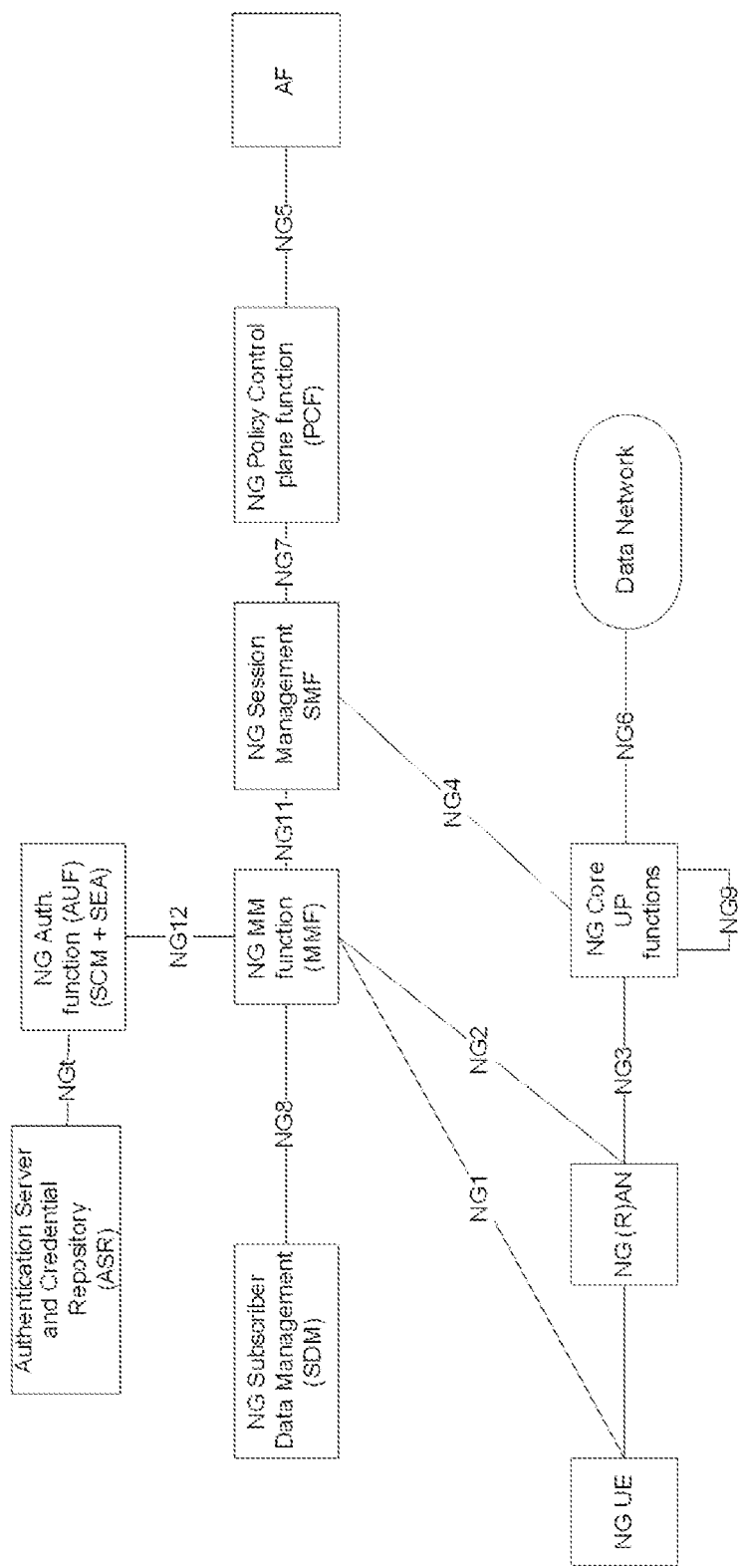
FIG. 7 is a block diagram illustrating an embodiment of a non-roaming reference architecture, in accordance with certain embodiments.

Concurrent Access to Local and Centralized Services is Supported as Follows
 Multiple PDU sessions to both a local UP function (providing access to local data networks) and a central UP function (providing access to central data networks); or
 A single PDU session, for which the control plane has configured two UP functions: one UP function performing traffic classification and traffic steering towards either the local data network or the central data network, the other UP function providing access to the central data network (as depicted in FIG. 7.6.2-3).

NOTE 2: The control plane can also configure multiple UP functions in the single PDU session case for local data network access.

FIG. 7.6.2 Reference Architecture

FIG. 7 (labeled as FIG. 7.6.2-1 in section 7.6 from 3GPP TR 23.799v1.0.2) depicts the non-roaming architecture functional view.

FIG. 7.6.2-1: Non-Roaming Reference Architecture

Figure 8:
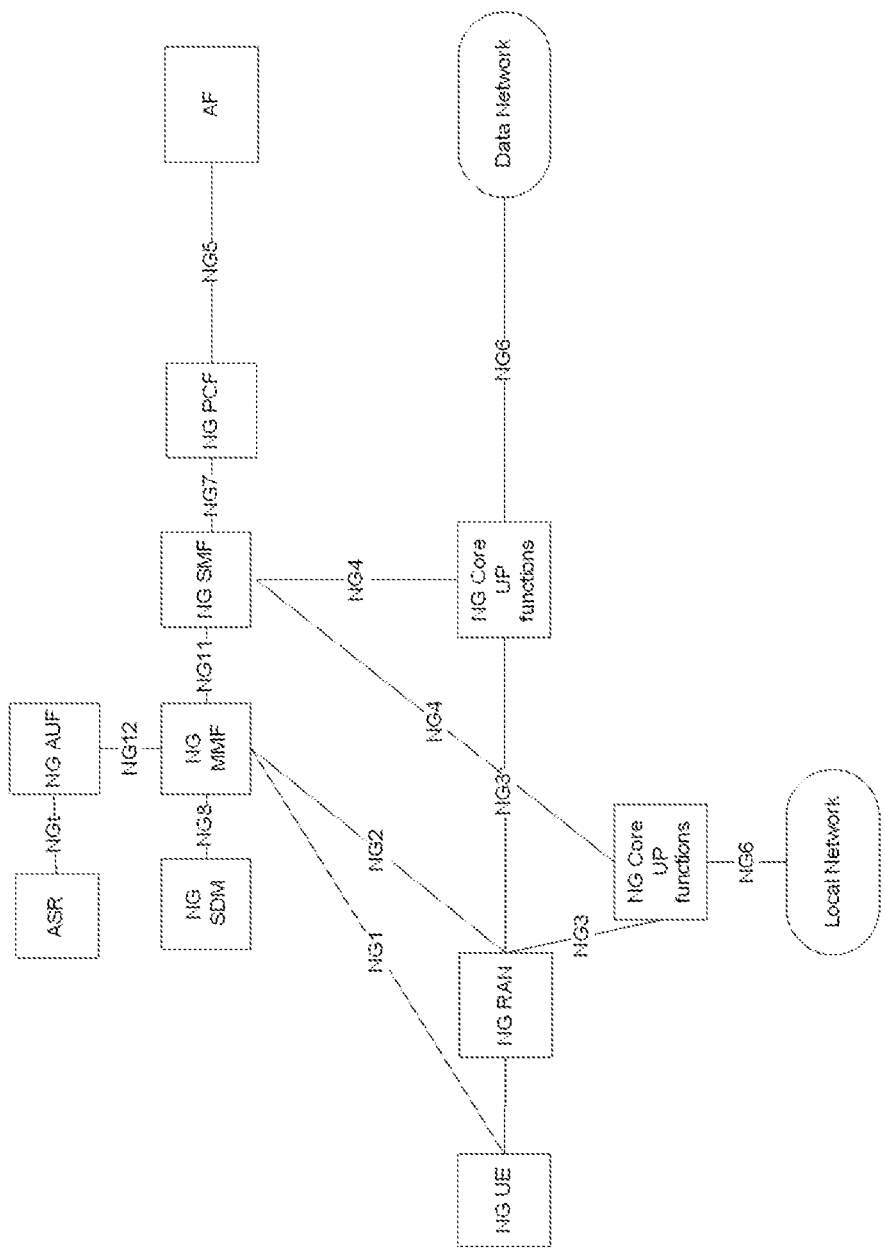
FIG. 8 is a block diagram illustrating an embodiment of a non-roaming reference architecture applied for concurrent access to local and central data networks with multiple protocol data unit sessions, in accordance with certain embodiments.

FIG. 8 (labeled as FIG. 7.6.2-2 in section 7.6 from 3GPP TR 23.799v1.0.2) depicts the non-roaming architecture for UEs concurrently accessing a local and a central data network using multiple PDU Sessions.

FIG. 7.6.2-2: Applying Non-Roaming Reference Architecture for Concurrent Access to Local and Central Data Networks (Multiple PDU Session Option)

Figure 9:
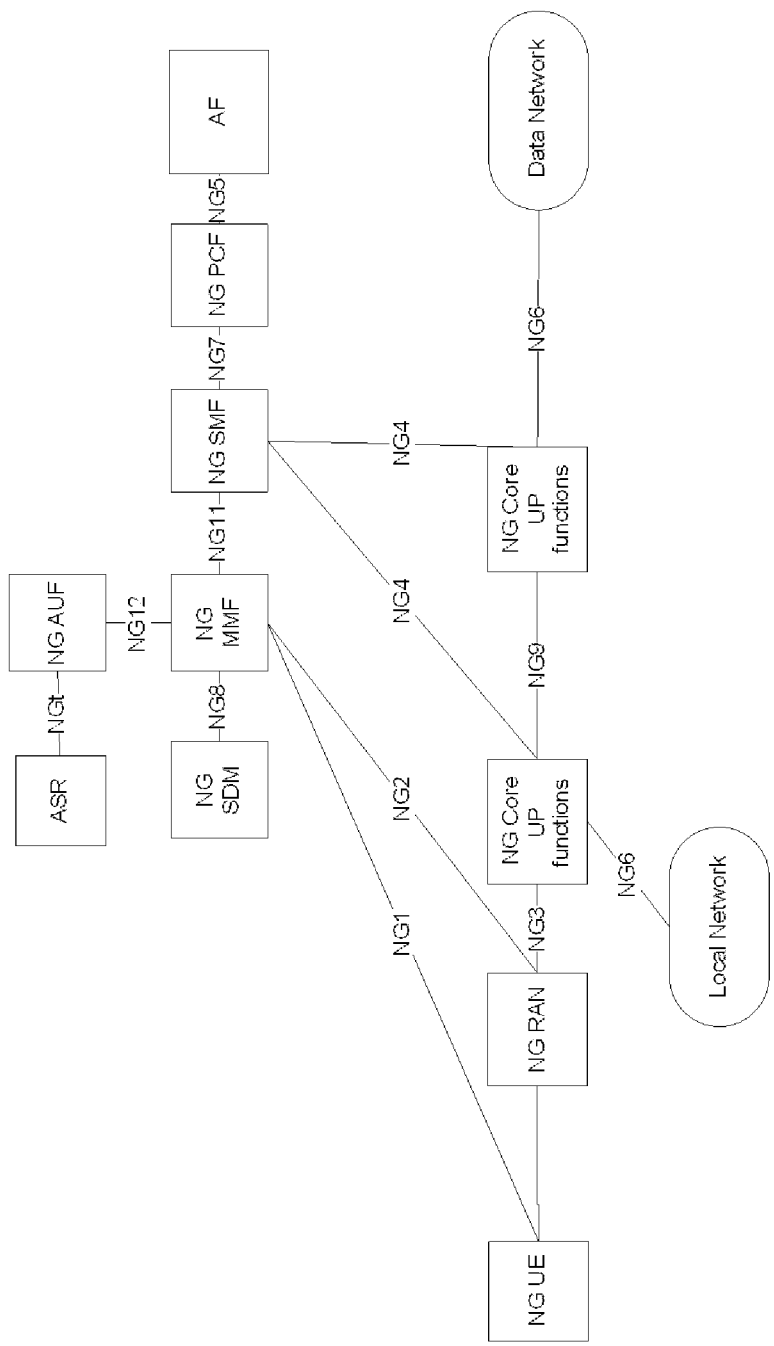
FIG. 9 is a block diagram illustrating an embodiment of a non-roaming reference architecture applied for concurrent access to local and central data networks with a single protocol data unit session, in accordance with certain embodiments.

FIG. 9 (labeled as FIG. 7.6.2-3 in section 7.6 from 3GPP TR 23.799v1.0.2) depicts the non-roaming architecture in case concurrent access to local and central data networks is provided within a single PDU session:

FIG. 7.6.2-3: Applying Non-Roaming Reference Architecture for Concurrent Access to Local and Central Data Networks (Single PDU Session Option)

Figure 10:
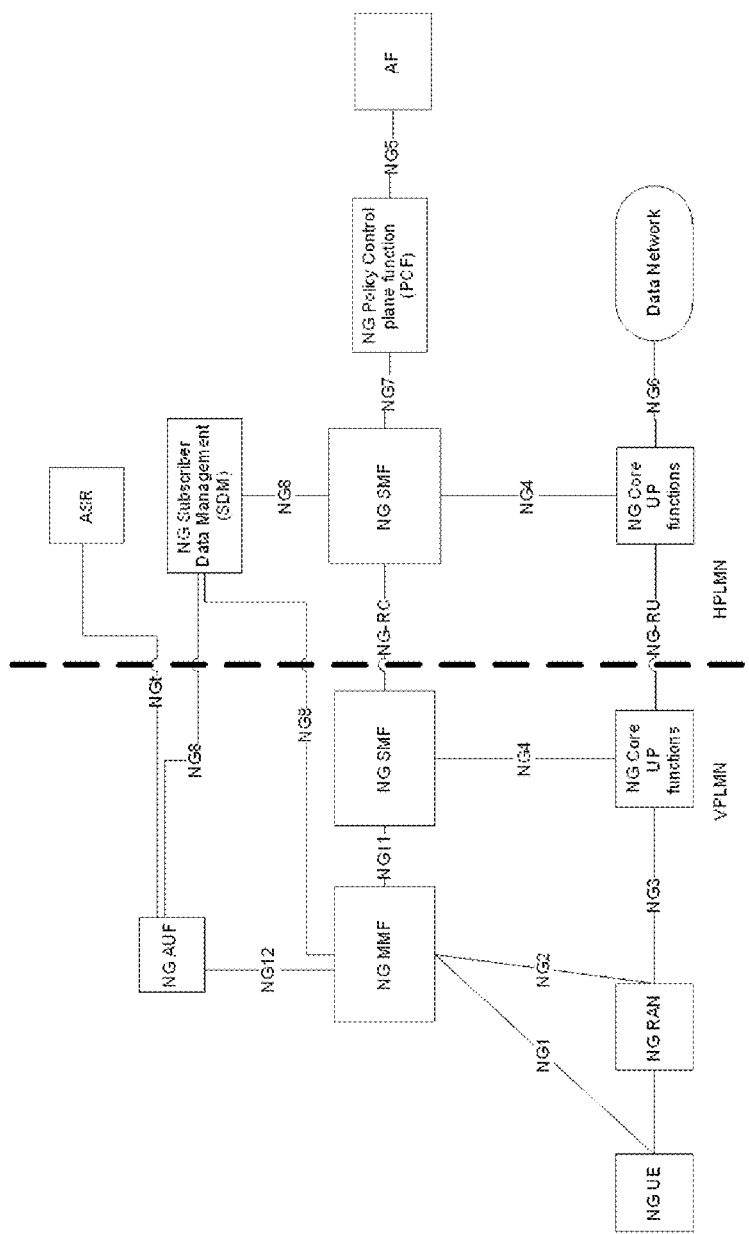
FIG. 10 diagram illustrating an embodiment of a non-roaming reference architecture in a home routed scenario, in accordance with certain embodiments.

FIG. 10 (labeled as FIG. 7.6.2-4 from section 7.6 from 3GPP TR 23.799v1.0.2) depicts the roaming architecture in case of home routed scenario:

FIG. 7.6.2-4: Roaming Reference Architecture—Home Routed Scenario

Figure 11:
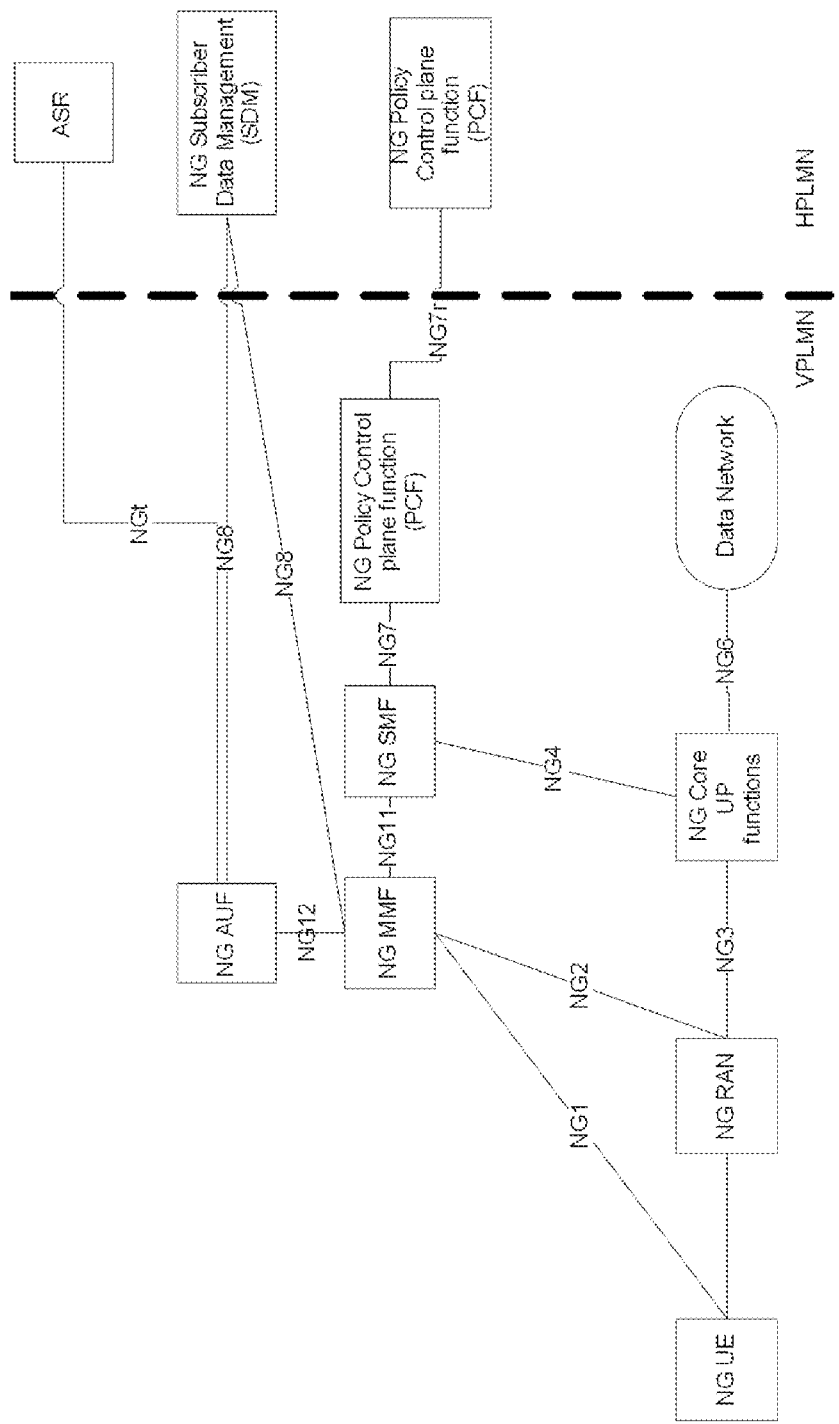
FIG. 11 is a block diagram illustrating an embodiment of a non-roaming reference architecture in a local breakout scenario, in accordance with certain embodiments.

FIG. 11 (labeled as FIG. 7.6.2-5 from section 7.6 from 3GPP TR 23.799v1.0.2) depicts the roaming architecture in case of local break out scenario.

FIG. 7.6.2-5: Roaming Reference Architecture—Local Breakout Scenario

Editor's note: The choice between NG6* and NG6 depends on whether the PDU Session has a single IP address/prefix or multiple IP address/prefixes. It is FFS whether both types need to be supported. Whether the distinction between NG6 and NG6* is needed is also FFS.

Editor's note: The interconnection model for all control plane network functions is FFS.

Editor's note: Need for NG8 from H-SMF to NG-SDM (i.e. in the home routed scenario) is FFS.

NOTE 3: Regardless of the number of CCFs, there is only one NAS interface instance between the UE and the CN, terminated at one of the CCFs that implements at least access authentication and mobility management.

NOTE 4: Criteria to select multi-vendor open (standardized) interfaces should be determined.

7.6.3 Network Functions and Reference Points

The 5G Reference Architecture Consist of the Following Functions:

NG Subscriber Data Management (NG SDM)
    NG Authentication Server and Credential Repository (NG ASR)
    NG Policy Control function (NG PCF)
    NG Core Mobility Management Function (NG MMF)
    NG Core Session Management Function (NG SMF)
    NG Authentication Function (NG AUF)
    NG Core User plane function (NG UPF)
    NG RAN
    NG UE
    Data network, e.g. operator services, Internet access or 3rd party services. The following is a high level split of functionality between the control plane and the user plane.

The NG Mobility Management Function (MMF) Includes the Following Functionality:

Termination of RAN CP interface (NG2)
    Termination of NAS (NG1), NAS ciphering and integrity protection
    Mobility Management
    Lawful intercept (for MM events and interface to LI System)
    Transparent proxy for routing access authentication and SM messages.

The NG Authentication Function (AUF) Includes the Following Functionality:

Access Authentication
    Derivation of keys required by other functions of NGC for serving the UE.
    Editor's note: AUF functionality and roaming architecture needs to be updated based on outcome of Key issue #12, SA3 work on Security framework for NextGen.

The NG Session Management Function (SMF) Includes the Following Functionality:

Session Management
    UE IP address allocation & management (incl optional Authorization)
    Selection and control of UP function
    Termination of interfaces towards Policy control and Charging functions
    Policy & Charging rules handling, including control part of enforcement and QoS
    Lawful intercept (for SM events and interface to LI System)
    NOTE 5: Not all of the MMF, SMF, AUF functions are required to be supported in an instance of CCFs of a network slice The NG Core User Plane Function Includes the Following Functionality:

Anchor point for Intra-/Inter-RAT mobility (when applicable)
    External PDU session point of interconnect (e.g. IP).
    Packet routing & forwarding
    QoS handling for User plane
    Packet inspection and Policy rule enforcement
    Lawful intercept (UP collection)
    Traffic accounting and reporting
    NOTE 6: Not all of the UPF functions are required to be supported in an instance of user plane function of a network slice.

The NG Policy Function Includes the Following Functionality:

Supports unified policy framework to govern network behaviour.
    Provides policy rules to control plane function(s) to enforce them.
    Editor's note: The need for an interface between NG Policy Function and SDM is FFS.

The NG ASR Supports the Following Functionality:

Authentication Credential Repository and Processing Function—This function stores the long-term security credentials used in authentication.
    Authentication Server Function (AUS)—This function interacts with the AUF.
    Editor's note: ASR functionality needs to be updated based on outcome of SA3 work on Security framework for NextGen.

The NG SDM Supports the Following Functionality:

Subscription repository.

The 5G Reference Architecture Contain the Following Reference Points:

NG1: Reference point between the UE and the NG Mobility Management function.

NG2: Reference point between the RAN and the NG Mobility Management function.

NG3: Reference point between the RAN and the NG Core User plane function.

NG4: Reference point between the NG Core Session Management function and the NG Core User plane function.

NG5: Reference point between the NG Core Session Management function and an Application Function.

NG11: Reference point between Mobility Management function and Session Management function.

NG12: Reference point between Mobility Management function and Authentication function.

NGt: Reference point between Authentication function and ASR function.

NG6: Reference point between the NG Core UP functions and a Data Network (DN).

NG6*: Reference point between a NG Core UP function and a local Data Network (when concurrent access to both a local and central data network is provided for one PDU session with a single IP address/prefix).

NOTE 7: Details of NG6* mechanism are beyond the scope of 3GPP.

NG7: Reference point between the NG Session Management function and the NG Policy Control function.

NG8: Reference point between the NG Mobility Management function, Authentication function and the Subscriber Data Management.

NG9: Reference point between two NG Core User plane functions.

NG7r: Reference point between the V-PCF and the H-PCF.

NG-RC: Reference point between the V-SMF and the H-SMF.

Figure 12:
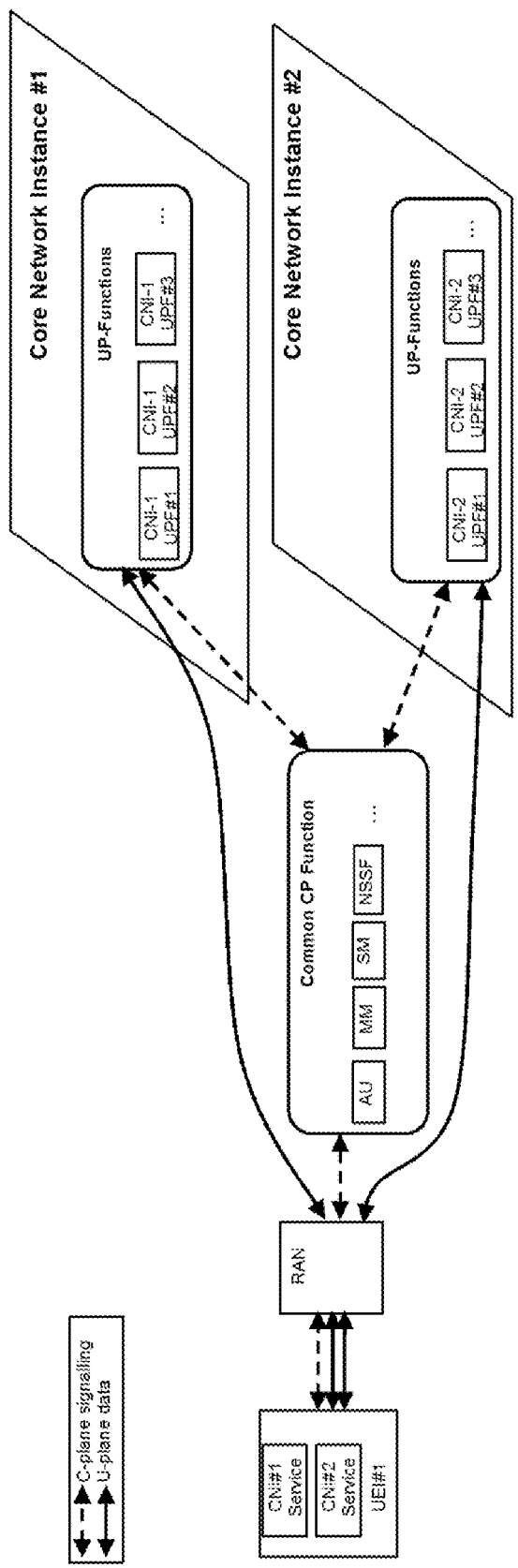
FIG. 12 is a block diagram illustrating an embodiment of a user equipment connected to multiple network slices, in accordance with certain embodiments.

FIG. 12 is a block diagram illustrating an embodiment of a user equipment (UE) connected to multiple network slices, in accordance with certain embodiments. UE has a single NAS termination point at Common CP Function (CCF). This results in RAN having a single Control Plane (CP) interface for that UE. The User Plane (UP) is shown as being separated one per Core Network Instance (CNI).

When it comes to one physical RAN used for multiple network slices, two aspects should be taken into account. The first aspect is that network slicing should make possible to support several different virtual networks on the same physical network infrastructure in order to reduce costs and energy consumption compared to deploying separate physical networks for the different use case or business scenarios. In order to fully exploit this benefit, it is required that the slicing concept allows for efficient usage of common resources such as radio resources and infrastructure, and transport links between the slices such as fronthaul and backhaul. The second aspect is that mechanisms are required to protect common channels or resources used for UEs accessing system so that congestion in one slice does not have a negative impact on another slice (often called slice isolation). Currently in 3GPP system there is some support for protecting common control channels for extensive load from different services. These mechanisms include Access Class Barring, Enhanced Access Barring, Service Specific Access Barring, as well as implementation specific admission control etc. These are described in the next section.

One problem which has not been addressed is related to limited slice availability in the network. Limited slice availability could be scenarios where a given network slice is not supported in all cells of the cellular network or not for all UEs/subscribers in all cells. If this is the case problems will occur when the UE is moving in or out of areas with different slice support. Problem will also occur when UE is connecting to the network for the first time (or is re-connecting) in case the slice the UE wants to connect to or is already registered in is not available in that area. Accordingly there is proposed herein several embodiments for handling limited slice availability in the network. The advantage of the solutions is that limited slice availability is handled in a consistent way avoiding issues such as:

Frequent signalling for UEs moving in areas of limited slice availability

Consistent user experience by making sure the UE knows when it is connected to a slice and not, avoiding cases where the UE thinks it is connected but where the UE has moved to an area where the slice is not supported.

Efficient management of slice availably in the network by different network nodes (CN nodes, base stations) synchronizing the support of different slices between each other.

This has several sub advantages since it allows for mobility control considering slice availability, it also makes it possible for the CN to manage slice connectivity for the UE based on the information provided by the RAN.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

The text is structured as follows:

Some assumptions about limited slice availability

Sample embodiments for handling information of slice availability in the network. These solutions are independent of ongoing UE sessions.

Sample embodiments for handling slice availability in the network towards the UE Sample embodiments in the UE for connecting to a network with limited slice availability Sample methods for managing access to slice resources Assumptions about Limited Slice Availability The work on network slicing has progressed in the 3GPP meetings with some text and agreements being captured in the technical reports etc. One topic however that has not been discussed so much is if a given network slice should be available in all base stations/cells or if the concept should support network slices which are only available in a subset of the base station/cells.

Although it would be technically simple if all slices where available in all base station or cell, we assume this not possible. Operator may want to offer a slice only in a specific region and prefer not to configure other network nodes in other regions to support the same slice. There could also be scenarios where access to a slice is very location dependent e.g. only within an enterprise campus, factory, processing planet, . . . meeting some specific business or performance needs which cannot be provided network wide. So from this we draw the conclusion that all network slices will not be available in all base station of a cellular network. I.e. the networks will typically support slices with limited availability. Limited availability here could mean

- That the slice is only supported in a specific area, e.g. cell, region, tracking area
- That the slice is only availability during special times, e.g. during the day, or for a given period of time which could be hours, days, months, year.
- That the slice is only available for certain users.
- Combination of the above is also possible, e.g. only available for certain users, in a certain area, at a certain time.

Sample Embodiments for Handling Information of Slice Availability in the Network.

With the assumptions that slices are not always available solutions are here proposed for how the information about availability can be handled inside the network. The solutions are as follows:

- Different nodes know or are configured with knowledge about which network slice they support. Different nodes here can be for instance different based stations (e.g. eNBs, gNB) as well as different CN nodes (MMEs, MMFs, NG CN nodes).
- The information about which slices a node support is then exchanged with other nodes. This enables for instance that:
- The RAN nodes knows which network slices each CN node supports. This could then be used for CN node selection when a UE enters the network and provides a slice ID to the RAN node.
- Different RAN nodes will know what slices other RAN nodes support or in which cells of the other RAN nodes a given slice is supported. This can then later be used for trigger UE handover to a specific cell based on the knowledge that the slice the UE is connected is support in the target RAN node/cell.
- The CN nodes knows which slices is supported in different RAN nodes, making it possible to manage the slice connectivity of the UE, e.g.
  - Remove connections to slices which are no longer available in the RAN node the UE is connect to
  - Add connections to slices which becomes available when the UE moves to a new RAN node.
  - Reject incoming request from the UE for slice connectivity if the network slice is not supported in the RAN node the UE is communicating with.

Note: The examples above are further elaborate in later embodiments.

- The signaling of slice support can be sent at initial connection setup between network nodes (E.g. at X2/Xn setup between RAN nodes or S1/NG setup between CN and RAN nodes). It can also be done dynamically when the slice availability changes (e.g. event triggered). Slice availability can also be conveyed together with UE related signaling e.g.
- In handover signaling between base stations
- During initial UE message (from RAN to CN) for UEs performing a state transition from an IDLE to active state Sample Embodiments for Handling Slice Availability in the Network Towards the UE In order to get a consistent UE performance, solutions are proposed on how to handle the limited slice availability towards the UE. Several embodiments are considered:

UEs in a Low Power State Characterized by UE Performing Cell Selection by Itself (Based on Network Configuration)

Cellular networks typically support power saving stage like CN IDLE where the UE is allowed to move in an area without notifying the network, listening for paging from the network. In CN IDLE this area is the area of a Tracking Area List. But it could also be an area of a cell or a list of cells.

In networks with limited slice availability a given slice may not be supported in all cells. A problem could then occur where the UE in power saving is camping on a cell which does not support the slice the UE is connected to. Assuming the cell does not provide information about all slices it supports or that the UE, in order to save power does not read such information, there is no way the UE would know that the slice is no longer supported. This problem is addressed with the following embodiment:

- A network node (e.g CN node or RAN node) responsible for managing paging areas for a UE (a paging area is the area that the UE can move around without performing and mobility related signaling, while still be reachable from the network). The paging area can consist of cells, tracking areas, nodes etc.
- The network node combines information about slice availability in the surrounding network nodes and cells, with information about which slices the UE is connected to or is capable of being connected to, or is allowed to connect to, in order to create a paging area with consistent slice availability for the specific UEs. Additional information used in this process could include past UE mobility history, UE subscription parameters etc.
- Consistent slice availability here means that the same slices are accessible in all nodes or cells belonging to the paging area.
- The paging area is then conveyed to the UE. The UE is allowed to move around within the paging area without generating mobility signaling. If the UE moves outside the network the UE would trigger an area update procedure including signaling to the network. In this way the network node will know that UE has left the paging area.
- Once the network nodes receive area update signaling from the UE the network node can trigger the additions or removal of network slices if needed. It can also generate a new paging area that also has consistent slice availability, potentially considering the new or removed slice connectivity. As an example, if a UE moves out of a paging area with support for Slice 1, 2 and 3, the UE will perform mobility signaling towards the network node responsible for paging area maintenance. If as a result the UE moves in an area where only Slice 1 and 2 are supported, the network node may provide the UE with a new paging area where Slice 1 and 2 are consistently available.

UEs in an Active State with Network Controlled Mobility (e.g. Using Handover)

When the UE is active in the system it is capable of sending/receiving data from the network. Typically, the network controls the mobility in this state using handover procedures. Assuming the network does not support all slices in all nodes, cells or frequency bands. In this case the UE would lose slice connectivity if it moves to an area where the slice is not supported. This could lead to poor service performance. This problem is addressed with the following embodiment:

- A network node responsible for performing network controlled handover for UEs e.g. considering UE mobility, radio measurements, . . . .
- The network node combines information about slice availability in the surrounding network nodes and cells, with information about which slices the UE is connected to or is capable of being connected to, or is allowed to connect to, in order to select a handover candidate node or cell or frequency which supports the slices the UE is connected to or capable of being connected to, or is allowed to connect to. This can address cases e.g. where a slice is only supported in a specific frequency layer or radio access technology (RAT). In this way service interruption can be avoided since the UE can be directed to the frequency layer or RAT that supports the slice.
- If the network node is forced to do a handover but is not able to trigger a handover to a node, area, cell, . . . which supports the slices the UE is connected. The network node (or the target network node) can initiate the removal of the slice the UE is connected. By actively initiate the removal it is expected that the experienced performance of the UE can be improved e.g. compared with relying on service time out. It is also possible in the solution to move the slice that is nominally not supported by the target node to a different slice using the knowledge about slice availability. Namely, services that were assigned to a slice no longer available in the target node may be now supported by another slice, available in the target node, if this is allowed.

UE is Returning from a Low Power State to an Active State

In this case the UE will send a request to the network to transition to an active state e.g. to perform signaling or user data transfer. The receiving network node can based on the knowledge of which slices the UE are connected to or wants to connected, together with information about slice availability in the network decide to either accept or reject the UE request. E.g.

- UE connects to network node A, requesting connectivity to slice B
- Network node does not support slice B (e.g. could be temporary) or currently does not have resources left to support more Slice B users.
- Network node rejects UE request or re-direct the request to another slice Another example is:

- UE connects to network node A, requesting connectivity to slice B
- Network node supports slice B but knows that neighbor node does not support slice B, and network nodes determine that the UE performance may not be so good given that the UE may move later into the node that does not support slice B.
- Network node rejects UE request or re-direct the request to another slice The reject message that the network sends to the UE can include re-direction instructions to other frequency bands etc. where the slice is supported.

Sample Embodiments in the UE for Connecting to a Network with Limited Slice Availability There is also embodiment in the UE for handling limited slice availability. These embodiments could include the UE reading information from the broadcast channel of the system (the information is broadcasted from the network). The information is related to the slice availability in the cell, frequency for which the broadcast information is associated with. Different sub embodiments exist:

- The network broadcast the slice availability in the cell/node
- The network broadcast a parameter which is associated with the slice availability, the mapping from this parameter to the slice availability could be performed in the UE, possible based on configuration received from the network at an earlier stage.
- The advantage of this embodiment is that less information most likely need to be broadcasted in the cell, and that the true slice availability could be only known for UEs which has been configured to know this.

Once the UE reads the information about the slice availability it can take different actions:

- It can initiate the setup or the removal of a slice connection. E.g. by sending signaling message to network.
- In case a given slice is not supported the UE can perform cell or frequency or RAT re-selection to a different cell or frequency or RAT. E.g. where the slice is supported.
- The lower layers of the UE can notify higher layers that a slice is either available or not available based on the broadcasted information
- Other actions are also possible.

Sample Methods for Managing Access to Slice Resources

In the network the knowledge about slice availability can be used in access control, as well as assigning resources too different UEs. It is possible for the network to assign the UE a slice policy parameter which is associated with a specific slice or a group of slice. When the UE request resources for a slice indicating this slice policy parameter the RAN can either accept or reject the UE connecting e.g. based on if the slice is available or not.

Similar functionality can also be applied between network nodes when one node is asking for resources for a slice that a UE is connected to. The resource request can include information about which slice the UE wants to use or is connected to. The target node (e.g. the serving base station, or target base station at handover) can then either accept or reject request based on slice availability. Also partial reject is possible where resources for some slices are accepted while other slices are not.

Other functionality that can be applied between network nodes, could be for one node e.g. CN node to generate a mobility restriction list which is sent to another node e.g. RAN node. This mobility restriction list may be based on information about which slices the UE is connected to or may access, and information about slice availability in other nodes. This mobility restriction list can then be used by the other node when controlling the mobility of the UE e.g. to avoid that the UE goes to an area where a given slice is not supported. The mobility restriction list can also be provided to the UE to control the UE cell selection.

Figure 13:
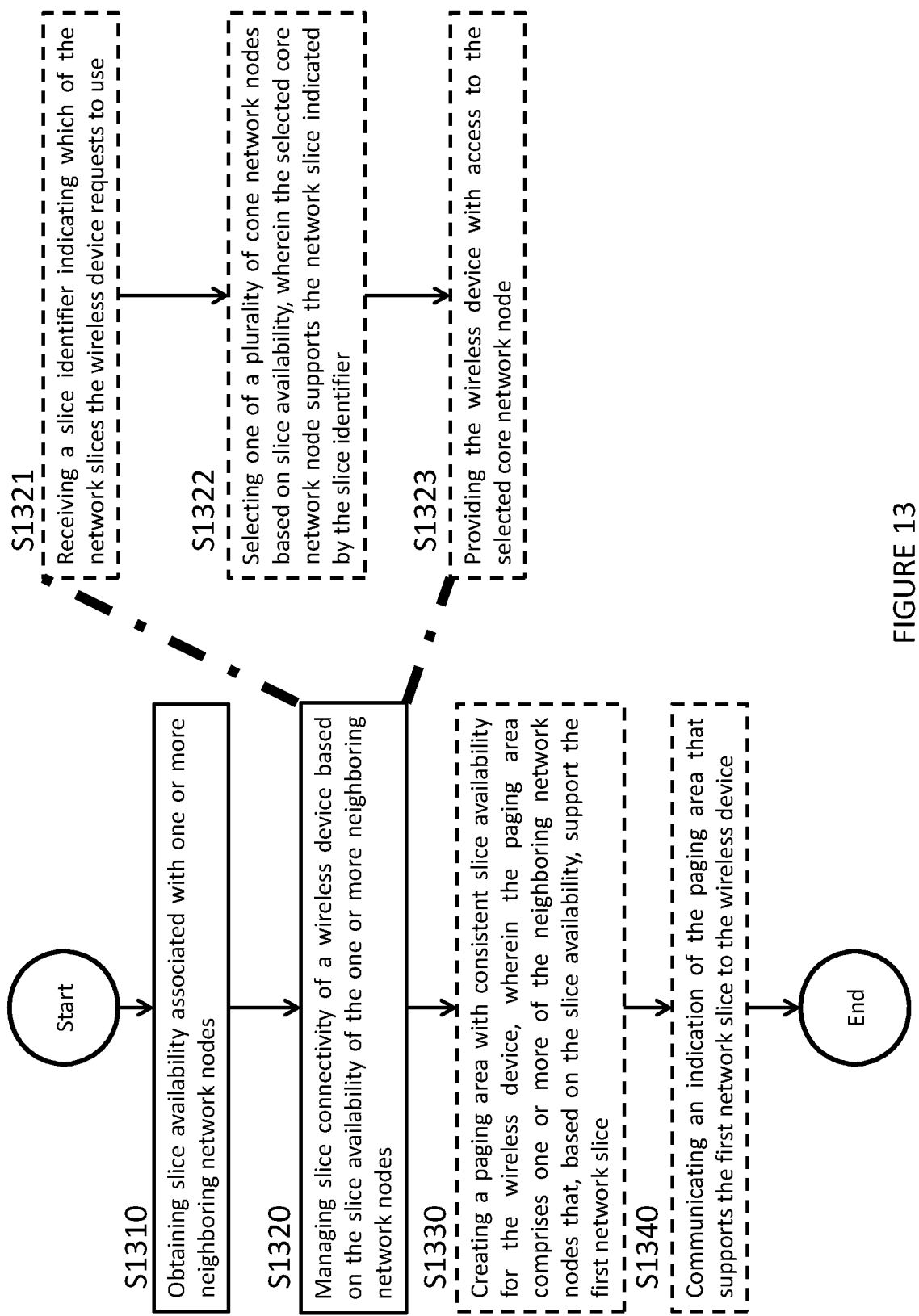
FIG. 13 is a flow diagram of a method in a network node, in accordance with certain embodiments.

FIG. 13 is a flow diagram of a method in a network node. The method may be performed in any suitable network node, such as a radio access network node or a core network node. Examples of radio access network nodes and core network nodes are illustrated in FIGS. 1-12. As one example, the method may be performed by network node 200 of FIG. 2. At step S1310, network node 200 obtains slice availability associated with one or more neighboring network nodes. The neighboring network nodes may include the same type of node as the network node performing the method (e.g., neighboring nodes of an eNB may include other eNBs, neighboring nodes of an MME may include other MMES, neighboring nodes of a gateway may include other gateways, etc.) In addition, or in the alternative, neighboring nodes may include different types of nodes. As an example, in certain embodiments, a core network node may obtain slice availability associated with radio access network nodes, As another example, in certain embodiments, a radio access node may obtain slice availability associated with core network nodes. In certain embodiments, the network slice availability indicates which of a plurality of network slices is supported by each of the one or more neighboring network nodes. For example, in certain embodiments, neighboring network nodes may have limited network slice availability, such that one or more of the neighboring network nodes may support only a limited subset of all network slices and/or the neighboring network nodes may support different network slices.

At step S1320, network node 200 manages slice connectivity of a wireless device, such as wireless device 210 of FIG. 2 or UE 300 of FIG. 3, based on the network slice availability of the one or more neighboring network nodes. In this manner, the performance of the wireless network, including wireless device 210 and network node 200, may be improved by managing the connectivity using the obtained network slice availability.

In certain embodiments, certain steps in the method discussed in FIG. 13 may comprise substeps. For example, in certain embodiments, the one or more neighboring nodes comprise a plurality of core network nodes. In some embodiments, step S1320 may comprise optional substeps. At substep S1321, network node 200 receives a slice identifier indicating which of the network slices wireless device 210 requests to use. In some embodiments, a single network slice identifier is received at network node 200, or alternatively, more than one network slice identifier is received. For example, in some embodiments, the slice identifier received at network node 200 may comprise separate slice identifiers for each of the network slices wireless device 210 requests to use. At substep 1322, network node 200 selects one or more of the core network nodes based on the network slice availability. Selecting one or more of the core network nodes may include selecting a single core network node, selecting a subset of core network nodes (e.g., a subset comprising more than one core network node, but fewer than all core network nodes), or selecting all core network nodes. For example, the core network node(s) may be selected based on a functional group thereof. The one or more selected core network node supports the network slice indicated by the slice identifier. At substep 1323, network node 200 provides wireless device 210 with access to the selected core network node. In this manner, network node 200 may ensure that wireless device 210 is provided the proper access to a core network node that supports the requested network slice. As discussed above, this is particularly important when there is limited network slice availability at one or more network nodes, such as limited network slice availability at one or more core network nodes.

In certain embodiments, the one or more neighboring nodes comprise a plurality of radio network nodes. For example, the one or more neighboring nodes may comprise one or more evolved NodeB or any other radio network nodes. As an example, the one or more neighboring nodes may comprise one or more radio network nodes that make up at least a portion of radio access network 120. In some embodiments, step 1320 of managing the slice connectivity of the wireless device comprises substeps. For example, in certain embodiments, network node 200 may determine which of the network slices wireless device 210 is connected to. Network node 200 may then select one of the radio network nodes for handover based on the network slice availability. The selected radio network node supports the network slice(s) that wireless device 210 is connected to. Network node 200 may then initiate handover of wireless device 210 to the selected radio network node. In this manner, network node may ensure that wireless device 210 is handed over to a radio network node that supports the network slice(s) it currently is connected to.

In certain embodiments, managing slice connectivity includes initiating removal of a connection between the wireless device and a network slice that is unsupported by a neighboring network node selected for a handover procedure involving the wireless device. For example, network node 200 may, during handover or prior to handover, may remove connection to particular network slices that would not be supported in the new network node. In this manner, network node 200 may prevent wireless device 210 from attempting to access an unsupported network slice after handover.

In certain embodiments, managing slice connectivity includes receiving, from wireless device 210, a request to connect to a first network slice. In some embodiments, network node 200 may determine that the first network node does not support the first network slice. In response, network node 200 may reject the request and redirect wireless device 210 to another network slice. In this manner, network node 200 may prevent wireless device 210 from attempting to access an unsupported network slice.

In certain embodiments, managing slice connectivity includes receiving, from the wireless device, a request to connect to a first network slice. In some embodiments, network node 200 may determine that there is a likelihood of wireless device 210 moving to a neighboring network node that does not support the first network slice. For example, network node 200 may use information regarding wireless device 210's movement or historical connection information to predict that wireless device 210 is likely to move to one or more neighboring network nodes that do not support the first network slice. In response, network node 200 may reject the request to connect to the first network slice and may redirect the wireless device to another network slice (i.e., based on the likelihood of the wireless device moving to a neighboring network node that does not support the first network slice).

In certain embodiments, the plurality of network slices comprises a first network slice. In certain embodiments, the method discussed in FIG. 13 may include optional additional steps. At step S1330, network node 200 creates a paging area with consistent network slice availability for the wireless device. The paging area comprises one or more of the neighboring network nodes that, based on the network slice availability, support the first network slice. For example, the paging area may comprise a group of neighboring network nodes, e.g., a coverage area, in which the network slice availability does not change. In some embodiments, the paging area may be specific to wireless device 210. For example, the paging area may comprise a group of neighboring network nodes that support all of the network slices that wireless device 210 is connected to and/or may request access to and/or that are supported by wireless device 210. At optional step S1340, network node 200 may communicate an indication of the paging area that supports the first network slice to the wireless device. In this manner, network node 200 may provide information to wireless device 210 that prevents unnecessary mobility signaling when moving within the paging area.

In certain embodiments, network node 200 may determine that wireless device 210 has added or removed a connection to one of the network slices. Network node 200 may, in response, create a new paging area with consistent network slice availability for the wireless device. For example, network node 200 may determine which neighboring network nodes support the changed set of network slices and create the new paging area accordingly. Network node 200 may then communicate the new paging area to the wireless device. In this manner, network node 200 may continue to prevent unnecessary mobility signaling by wireless device 210 even when wireless device 210 adds or removes connections to network slices.

In some embodiments, managing the slice connectivity of wireless device 210 comprises a substep of removing a connection between wireless device 210 and the first network slice. For example, network node 200 determine, based on the network slice availability, that the wireless device is connected to a radio access node that does not support the first network slice. In response, network node 200 may remove the connection to the first network slice. In this manner, wireless device 210 will be prevented from attempted to access a network slice that is not supported by the connected radio access node.

In some embodiments, managing the slice connectivity of wireless device 210 comprises a substep of adding a connection between wireless device 210 and the first network slice. For example, network node may determine, based on the network slice availability, that the wireless device is connected to a radio access node that supports the first network slice. In response, network node may add a connection to the first network slice. In this manner, wireless device 210 may be provided a connection to the network slice when available through the radio access node. Accordingly, wireless device 210 may be connected to a network slice that optimizes the performance of wireless device 210 and/or the wireless network. For example, wireless device 210 may operate on alternative network slices when the first network slice is unavailable on the currently connected-to radio access node. If the first network slice become available, either through the same radio access node or after changing radio access nodes, then it may be preferable to connect wireless device 210 to first network slice.

In some embodiments, managing the slice connectivity of wireless device 210 comprises a sub step of rejecting a request to connect the wireless device to the first network slice in response to determining that the wireless device is connected to a radio access node that does not support the first network slice. For example, wireless device 210 may have been previously connected to a radio access node that supported the first network slice, but has now connected to a second radio access node that does not support the first network slice. As another example, the connected-to radio access node may no longer support the first network slice, or may no longer have resources to connect wireless device 210 to the first network slice, and therefore does not support the first network slice.

In certain embodiments, each of the network slices comprises a respective logical network that supports a respective network function having different characteristics than the network functions of the other network slices. In certain embodiments, each of the network slices supports a respective business operation that is independent of the business operations supported by the other network slices.

In certain embodiments, at least a portion of the network slice availability is obtained during an initial connection set up between the first network node and at least one of the neighboring network nodes. For example, each network node in the wireless network may access their own network slice availability, e.g., which network slices are supported on the network node. During initial connection set up between the nodes, network node 200 may communicate its network slice availability information and receive the same from the neighboring nodes. In this manner, network node 200 may obtain network slice availability information during the initial connection set up.

In certain embodiments, at least a portion of the network slice availability is obtained from handover signaling between the first network node and one of the neighboring network nodes. For example, network nodes may exchange their network slice availability when communicating the signally for handover of wireless device 210. Additionally, in certain embodiments, once the network node has obtained the network slice availability of one of its neighboring nodes (e.g., neighboring node A), the network node may forward neighboring node A's network slice availability to another of its neighboring nodes (e.g., neighboring node B), Thus, network nodes may exchange their own network slice availability and/or the network slice availability of other network nodes. In some embodiments, the network slice availability may be incorporated into the existing handover signaling, e.g., as an additional parameter or message.

In certain embodiments, at least a portion of the network slice availability is obtained in response to the wireless device performing a state transition from an idle state to an active state. For example, wireless device 210 may transmit network slice availability information known to wireless device 210 to network node 200 during the state transition. In this manner, network node 200 may obtain network slice availability information that may be useful for managing the connection of wireless device 210 as it transitions to an active state.

In certain embodiments, the method discussed in FIG. 13 comprises the additional step of maintaining slice connection information at network node 200. The slice connection information may indicate which of the network slices wireless device 210 is connected to. Network node 200 may receiving an indication that wireless device 210 has added or removed a connection to one of the network slices. For example, wireless device 210 may no longer require access to a network slice or may want access to another or additional network slice. Network node 200 may update its slice connection information (slice connection information maintained by network node 200) based on the received indication. In this manner, network node 200 may maintain current slice connection information for wireless device 210. The slice connection information may be used for managing the connection of wireless device 210 to one or more network slices, including management at another network node, e.g., through signaling the slice connection information.

In certain embodiments, network node 200 may broadcast a parameter associated with its network slice availability and/or the network slice availability of one or more of the neighboring network nodes. In some embodiments, network node 200 communicates network node 200's network slice availability to one or more of the neighboring network nodes. Neighboring network nodes and/or wireless device 210 may use information determined from the parameter to determine the network slice availability of the network node 200 and/or one or more of the neighboring network nodes. In this manner, network node 200 may provide information to wireless device 210, or other network nodes, of the network slice availability that may be used for managing connections in a limited availability scenario.

A network slice may encompass functionality that is provided by a single network node or functionality that is distributed throughout a network. The functionality may be distributed in any suitable manner. For example, in certain embodiments, a first network node may provide a portion of the functionality of a network slice, and a second network node may provide another portion of the functionality of the network slice. Thus, selecting one or more core network nodes may comprise selecting one or more functional groups implemented on one or more network nodes. For example, network node 200 may select a function of several core network nodes and provide access to those functions across the several core network nodes to wireless device 210. Selecting a core network node may comprise selecting the network node in its entirety or selecting a functional group or function within the core network node that is limited to a subset of components within the network node (e.g., a subset of hardware, software, resources, memory, etc.).

Figure 14:
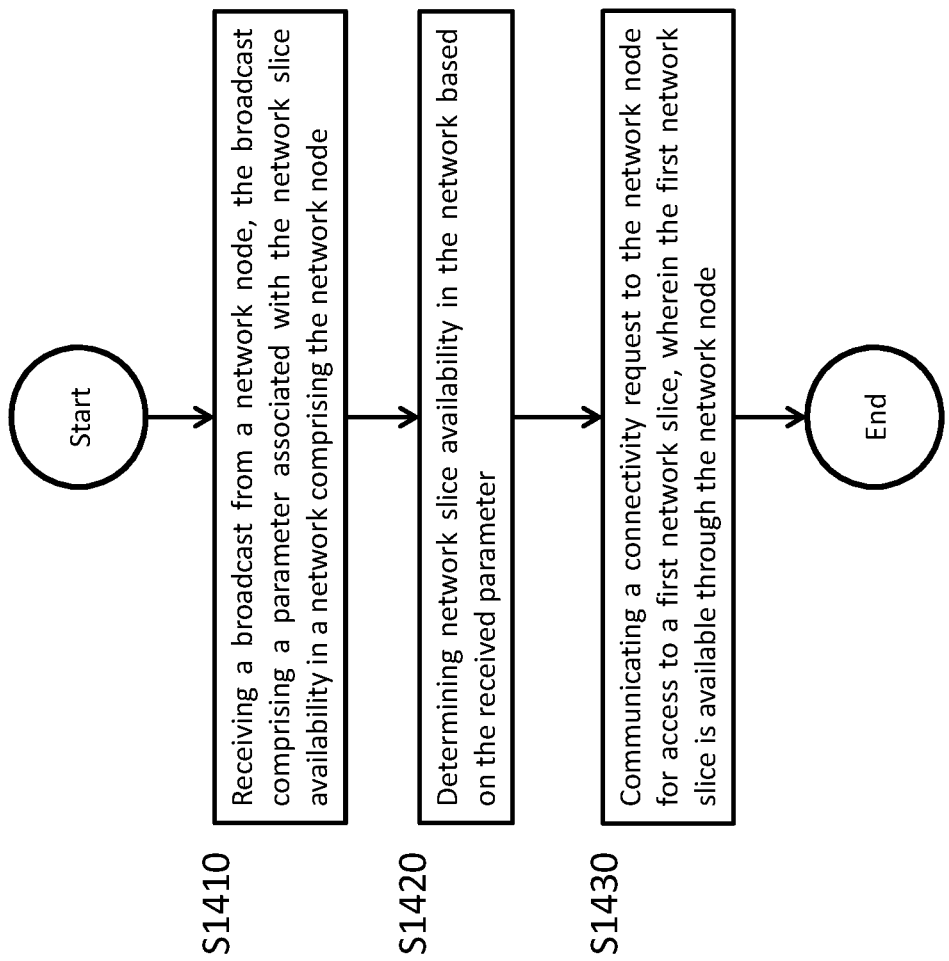
FIG. 14 is a flow diagram of a method in a wireless device, in accordance with certain embodiments.

FIG. 14 is a flow diagram of a method in a wireless device, such as wireless device 210 in FIG. 2 or UE 300 in FIG. 3, in accordance with certain embodiments. At step S1410, wireless device 210 receives, from a network node, such as network node 200, information associated with network slice availability in a network comprising the network node. In some embodiments, at least a portion of the information associated with network slice availability is received in a broadcast from the network node. In some embodiments, at least a portion of the information associated with network slice availability is based on network configuration information received from the network prior to receiving the broadcast from the network node.

At step S1420, wireless device 210 communicates a connectivity request to network node 200 for access to a first network slice. The first network slice may be selected by wireless device 210 based at least in part on the information associated with network slice availability received from the network node. For example, wireless device 210 may receive network slice availability information that indicates that network node 200 supports one or more network slices. In response, wireless device 210 may communicate its connectivity request for a network slice that is supported by network node 200. The first network slice may be a first choice of wireless device based on its connection needs, or alternatively, may be an alternative choice based on the availability at network node 200. In some embodiments, wireless device 210 communicates the information associated with network slice availability to network node 200 when performing a state transition from an idle state to an active state.

In certain embodiments, the method discussed in FIG. 14 includes additional optional steps. In certain embodiments, wireless device 210 initiates the setup of a network slice connection based on the information associated with network slice availability. In certain embodiments, wireless device 210 initiates a removal of a network slice connection based on the information associated with network slice availability. In this manner, wireless device 210 may adjust the network slice connections based on the information associated with network slice availability. For example, wireless device 210 may only want to maintain or establish connections to network slices that are supported on the network nodes wireless device 210 is connected to. In doing so, wireless device 210 may prevent attempts at accessing unsupported network slices.

In certain embodiments, wireless device 210 performs reselection of one or more of a cell, a frequency, or a radio access technology based on the information associated with network slice availability. For example, a particular network slice may not be available on the current cell, frequency, and/or radio access technology. Wireless device 210 may then perform reselection to select a cell, frequency, and/or radio access technology that supports the network slice. In some embodiments, performing reselection includes determining that a current cell, frequency, or radio access technology (RAT) on which the wireless device is operating does not support the first network slice. Wireless device 210 may then select a new cell, frequency, or RAT that supports the first network slice. Once selected, wireless device 210 may then access the first network slice through the new cell, frequency, or RAT. In this manner, wireless device 210 may connect to the desired network slice, even if it is not available on the current cell, frequency, or radio access technology.

In certain embodiments, wireless device 210 communicates a slice identifier indicating the first network slice. For example wireless device 210 may communicate the slice identifier to network node 200. Network node 200 may then identify which network slice wireless device requests access to. In response, network node 200 may determine which core network nodes support the desired network slices. Wireless device 200 may then access a core network node that supports the first network slice indicated by the slice identifier. In this manner, wireless device 210 may provide information for network node 200 to select the correct core network nodes in order to provide the desired connections to one or more network slices.

In certain embodiments, wireless device 210 receives an initiation of a handover procedure to a second network node. For example, the second network node may support the first network slice. Wireless device 210 may then complete handover to a second network node and access the first network slice through the second network node. In this manner, wireless device may continue to access the first network slice despite being handed over to a second network node.

In certain embodiments, wireless device 210 receives a paging area with consistent network slice availability for the wireless device. The paging area comprises one or more neighboring network nodes that, based on network slice availability of the neighboring network nodes, support the first network slice. For example, the paging area may include an indication of which of the neighboring network nodes support the first network slice. Wireless device 210 may then prevent the generation of mobility signaling when the wireless device is within the paging area. For example, wireless device may suppress any mobility signaling when moving within the paging area, even if moving between network nodes. In some embodiments, wireless device 210 communicates area update signaling from the wireless device when the wireless device moves outside the received paging area. For example, if wireless device 210 moves to a network node that does not support the first network slice, wireless device 210 may generate an area update to send to the current network node. Wireless device 210 may then receive a new paging area with consistent network slice availability for the wireless device. For example, wireless device 210 may receive a paging area that includes neighboring network nodes that support the same network slices supported at the current network node wireless device 210 is connected to.

In certain embodiments, wireless device 210 communicates wireless device 210's network slice connection information to the network node. Wireless device 210 may then receive handover signaling from the network node. The handover signaling may include a handover candidate based on the network slice availability of neighboring network nodes and the network slice connection information of the wireless device. For example, the handover candidate may be selected to be a network node that supports each of the network slices that wireless device 210 is connected to or is likely to request based on the network slice connection information. Wireless device 210 may then connect to the handover candidate. In this manner, wireless device 210 may provide sufficient information for network node 200 to select an appropriate handover candidate that supports the network slices wireless device is connected to. In some embodiments, the handover candidate does not support the first network slice. Wireless device 210 may then connect to a second network slice. For example, wireless device 210 may connect to a network slice that most closely relates to the first network slice or provides the most overlapping functionality provided by the first network slice.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method in a first network node, comprising:
 obtaining network slice availability associated with one or more neighboring network nodes, the network slice availability indicating which of a plurality of network slices is supported by each of the one or more neighboring network nodes;
 obtaining subscription parameters associated with a wireless device;
 managing slice connectivity of the wireless device based on the network slice availability of the one or more neighboring network nodes and the subscription parameters associated with the wireless device; and
 communicating an indication of one or more allowed beams to the wireless device based on the network slice availability and the subscription parameters.

2. The method of claim 1, wherein each of the network slices comprises a respective logical network that supports a respective network function having different characteristics than the network functions of the other network slices.

3. The method of claim 1, wherein each of the network slices supports a respective business operation that is independent of the business operations supported by the other network slices.

4. The method of claim 1, wherein the one or more neighboring nodes comprise a plurality of core network nodes, and wherein managing the slice connectivity of the wireless device comprises:
 receiving a slice identifier indicating which of the network slices the wireless device requests to use;
 selecting one or more of the core network nodes based on the network slice availability, wherein the one or more selected core network node supports the network slice indicated by the slice identifier; and providing the wireless device with access to the one or more selected core network nodes.

5. The method of claim 4, wherein the slice identifier comprises a separate slice identifier for each of the network slices the wireless device requests to use.

6. The method of claim 1, wherein the one or more neighboring nodes comprise a plurality of radio network nodes, and wherein managing the slice connectivity of the wireless device comprises:
determining which of the network slices the wireless device is connected to;
selecting one of the radio network nodes for handover based on the network slice availability, wherein the selected radio network node supports the network slice(s) that the wireless device is connected to; and
initiating handover of the wireless device to the selected radio network node.

7. The method of claim 1, wherein the plurality of network slices comprises a first network slice and wherein managing the slice connectivity of the wireless device comprises:
removing a connection between the wireless device and the first network slice in response to determining, based on the network slice availability, that the wireless device is connected to a radio access node that does not support the first network slice.

8. The method of claim 1, wherein the plurality of network slices comprises a first network slice and wherein managing the slice connectivity of the wireless device comprises:
adding a connection between the wireless device and the first network slice in response to determining, based on the network slice availability, that the wireless device is connected to a radio access node that supports the first network slice.

9. The method of claim 1, wherein the plurality of network slices comprises a first network slice and wherein managing the slice connectivity of the wireless device comprises:
rejecting a request to connect the wireless device to the first network slice in response to determining that the wireless device is connected to a radio access node that does not support the first network slice.

10. The method of claim 1, wherein at least a portion of the network slice availability is obtained during an initial connection set up between the first network node and at least one of the neighboring network nodes.

11. The method of claim 1, wherein at least a portion of the network slice availability is obtained from handover signaling between the first network node and one of the neighboring network nodes.

12. The method of claim 1, wherein at least a portion of the network slice availability is obtained in response to the wireless device performing a state transition from an idle state to an active state.

13. The method of claim 1, further comprising:
maintaining slice connection information at the first network node, the slice connection information indicating which of the network slices the wireless device is connected to;
receiving an indication that the wireless device has added or removed a connection to one of the network slices; and
updating the slice connection information maintained by the first network node based on the received indication.

14. The method of claim 1, wherein the plurality of network slices comprises a first network slice and wherein the method further comprises:
creating a paging area with consistent network slice availability for the wireless device, wherein the paging area comprises one or more of the neighboring network nodes that, based on the network slice availability, support the first network slice; and
communicating an indication of the paging area that supports the first network slice to the wireless device.

15. The method of claim 1, further comprising:
in response to determining that the wireless device has added or removed a connection to one of the network slices, creating a Previously Presented paging area with consistent network slice availability for the wireless device; and
communicating the Previously Presented paging area to the wireless device.

16. The method of claim 1, wherein managing slice connectivity further comprises initiating removal of a connection between the wireless device and a network slice that is unsupported by a neighboring network node selected for a handover procedure involving the wireless device.

17. The method of claim 1, wherein managing the slice connectivity further comprises:
receiving, from the wireless device, a request to connect to a first network slice; and
rejecting the request and redirecting the wireless device to another network slice in response to determining that the first network node does not support the first network slice.

18. The method of claim 1, wherein managing the slice connectivity further comprises:
receiving, from the wireless device, a request to connect to a first network slice; and
rejecting the request and redirecting the wireless device to another network slice based on a likelihood of the wireless device moving to a neighboring network node that does not support the first network slice.

19. The method of claim 1, further comprising broadcasting a parameter associated with the network slice availability of the first network node and/or one or more of the neighboring network nodes.

20. The method of claim 1, further comprising communicating the first network node's network slice availability to one or more of the neighboring network nodes.

21. The method of claim 1, wherein the method is performed in a core network node.

22. The method of claim 1, wherein the method is performed in a radio network node.

23. A network node comprising storage operable to store instructions and a processor operable to execute the instructions, whereby the network node is operable to:
obtain network slice availability associated with one or more neighboring network nodes, the network slice availability indicating which of a plurality of network slices is supported by each of the one or more neighboring network nodes;
obtaining subscription parameters associated with a wireless device;
manage slice connectivity of the wireless device based on the network slice availability of the one or more neighboring network nodes and the subscription parameters associated with the wireless device; and
communicating an indication of one or more allowed beams to the wireless device based on the network slice availability and the subscription parameters.

24. The network node of claim 23, wherein each of the network slices comprises a respective logical network that supports a respective network function having different characteristics than the network functions of the other network slices.

25. The network node of claim 23, wherein each of the network slices supports a respective business operation that is independent of the business operations supported by the other network slices.

26. The network node of claim 23, wherein the one or more neighboring nodes comprise a plurality of core network nodes, and wherein the network node operable to manage the slice connectivity of the wireless device comprises the network node operable to:
  receive a slice identifier indicating which of the network slices the wireless device requests to use;
  select one or more of the core network nodes based on the network slice availability, wherein the selected core network node supports the network slice indicated by the slice identifier; and
  provide the wireless device with access to the one or more selected core network node.

27. The network node of claim 26, wherein the slice identifier comprises a separate slice identifier for each of the network slices the wireless device requests to use.

28. The network node of claim 23, wherein the one or more neighboring nodes comprise a plurality of radio network nodes, and wherein the network node operable to manage the slice connectivity of the wireless device comprises the network node operable to:
  determine which of the network slices the wireless device is connected to;
  select one of the radio network nodes for handover based on the network slice availability, wherein the selected radio network node supports the network slice(s) that the wireless device is connected to; and
  initiate handover of the wireless device to the selected radio network node.

29. The network node of claim 23, wherein the plurality of network slices comprises a first network slice and wherein the network node operable to manage the slice connectivity of the wireless device comprises the network node operable to:
  remove a connection between the wireless device and the first network slice in response to determining, based on the network slice availability, that the wireless device is connected to a radio access node that does not support the first network slice.

30. The network node of claim 23, wherein the plurality of network slices comprises a first network slice and wherein the network node operable to manage the slice connectivity of the wireless device comprises the network node operable to:
  add a connection between the wireless device and the first network slice in response to determining, based on the network slice availability, that the wireless device is connected to a radio access node that supports the first network slice.

31. The network node of claim 23, wherein the plurality of network slices comprises a first network slice and wherein the network node operable to manage the slice connectivity of the wireless device comprises the network node operable to:
  rejecting a request to connect the wireless device to the first network slice in response to determining that the wireless device is connected to a radio access node that does not support the first network slice.

32. The network node of claim 23, wherein the network node is operable to obtain at least a portion of the network slice availability during an initial connection set up between the first network node and at least one of the neighboring network nodes.

33. The network node of claim 23, wherein the network node is operable to obtain at least a portion of the network slice availability from handover signaling between the first network node and one of the neighboring network nodes.

34. The network node of claim 23, wherein the network node is operable to obtain at least a portion of the network slice availability in response to the wireless device performing a state transition from an idle state to an active state.

35. The network node of claim 23, whereby the network node is further operable to:
  maintain slice connection information at the first network node, the slice connection information indicating which of the network slices the wireless device is connected to;
  receive an indication that the wireless device has added or removed a connection to one of the network slices; and
  update the slice connection information maintained by the first network node based on the received indication.

36. The network node of claim 23, wherein the plurality of network slices comprises a first network slice and whereby the network node is further operable to:
  create a paging area with consistent network slice availability for the wireless device, wherein the paging area comprises one or more of the neighboring network nodes that, based on the network slice availability, support the first network slice; and
  communicate an indication of the paging area that supports the first network slice to the wireless device.

37. The network node of claim 36, whereby the network node is further operable to:
  in response to determining that the wireless device has added or removed a connection to one of the network slices, create a Previously Presented paging area with consistent network slice availability for the wireless device; and
  communicate the Previously Presented paging area to the wireless device.

38. The network node of claim 23, wherein the network node operable to manage the slice connectivity of the wireless device comprises the network node operable to initiate removal of a connection between the wireless device and a network slice that is unsupported by a neighboring network node selected for a handover procedure involving the wireless device.

39. The network node of claim 23, wherein the network node operable to manage the slice connectivity of the wireless device comprises the network node operable to:
  receive, from the wireless device, a request to connect to a first network slice; and
  reject the request and redirecting the wireless device to another network slice in response to determining that the first network node does not support the first network slice.

40. The network node of claim 23, wherein the network node operable to manage the slice connectivity of the wireless device comprises the network node operable to:
  receive, from the wireless device, a request to connect to a first network slice; and
  reject the request and redirecting the wireless device to another network slice based on a likelihood of the wireless device moving to a neighboring network node that does not support the first network slice.

41. The network node of claim 23, whereby the network node is further operable to broadcast a parameter associated with the network slice availability of the first network node and/or one or more of the neighboring network nodes.

42. The network node of claim 23, whereby the network node is further operable to communicate the first network node's network slice availability to one or more of the neighboring network nodes.

43. The network node of claim 23, wherein the network node is a core network node.

44. The network node of claim 23, wherein the network node is a radio network node.

* * * * *